(12) United States Patent
Peracha

(10) Patent No.: US 8,261,278 B2
(45) Date of Patent: Sep. 4, 2012

(54) AUTOMATIC BASELINING OF RESOURCE CONSUMPTION FOR TRANSACTIONS

(75) Inventor: Zahur Peracha, Union City, CA (US)

(73) Assignee: CA, Inc., Islandia, NY (US)

(*) Notice: Subject to any disclaimer, the term of this patent is extended or adjusted under 35 U.S.C. 154(b) by 1252 days.

(21) Appl. No.: 12/024,783

(22) Filed: Feb. 1, 2008

(65) Prior Publication Data

US 2009/0199196 A1 Aug. 6, 2009

(51) Int. Cl.
*G06F 9/455* (2006.01)
*G06F 9/46* (2006.01)

(52) U.S. Cl. .............. 718/104; 718/1; 718/100

(58) Field of Classification Search .............. 718/1, 100, 718/104
See application file for complete search history.

(56) References Cited

U.S. PATENT DOCUMENTS

| | | | |
|---|---|---|---|
| 5,960,181 A | 9/1999 | Sanadidi et al. | |
| 6,260,187 B1 | 7/2001 | Cirne | |
| 6,760,684 B1 | 7/2004 | Yang et al. | |
| 6,816,882 B1 | 11/2004 | Conner et al. | |
| 6,862,623 B1 | 3/2005 | Odhner et al. | |
| 6,898,564 B1 | 5/2005 | Odhner et al. | |
| 7,243,145 B1 | 7/2007 | Poortman | |
| 7,249,179 B1 | 7/2007 | Romero et al. | |
| 7,284,052 B1 | 10/2007 | Anderson | |
| 7,577,770 B2* | 8/2009 | Tanaka et al. | 710/18 |
| 7,711,822 B1 | 5/2010 | Duvur et al. | |
| 7,941,427 B2 | 5/2011 | Barsness et al. | |
| 2002/0194251 A1* | 12/2002 | Richter et al. | 709/105 |
| 2004/0078691 A1 | 4/2004 | Cirne et al. | |
| 2005/0005012 A1* | 1/2005 | Odhner et al. | 709/226 |
| 2005/0091654 A1* | 4/2005 | Lection et al. | 718/100 |
| 2005/0120111 A1* | 6/2005 | Bailey et al. | 709/224 |
| 2005/0251802 A1 | 11/2005 | Bozek et al. | |
| 2006/0047808 A1 | 3/2006 | Sharma et al. | |
| 2006/0062148 A1 | 3/2006 | Ajiro et al. | |
| 2006/0085541 A1 | 4/2006 | Cuomo et al. | |
| 2006/0143608 A1* | 6/2006 | Dostert et al. | 718/1 |
| 2006/0173877 A1 | 8/2006 | Findeisen et al. | |
| 2006/0200546 A9 | 9/2006 | Bailey et al. | |
| 2006/0200820 A1 | 9/2006 | Cherkasova et al. | |
| 2006/0218551 A1 | 9/2006 | Berstis et al. | |
| 2006/0259621 A1 | 11/2006 | Ranganathan et al. | |
| 2007/0061813 A1* | 3/2007 | Beal et al. | 718/105 |
| 2007/0168494 A1 | 7/2007 | Liu et al. | |
| 2008/0034082 A1 | 2/2008 | McKinney | |

(Continued)

OTHER PUBLICATIONS

"Capacity Planning: Discipline for Data Center Decisions", TeamQuest Corporation, TQ-EB01 Rev. A, 2004, 34 pages.

(Continued)

*Primary Examiner* — Thomas Lee
*Assistant Examiner* — Samantha Hoang
(74) *Attorney, Agent, or Firm* — Vierra Magen Marcus & DeNiro LLP

(57) ABSTRACT

An application monitoring system determines the health of one or more resources used to process a transaction, business application, or other computer process. Performance data is generated in response to monitoring application execution and processed to determine and an actual and baseline value for resource usage data. Resource usage baseline data may be determined from previous resource usage data associated with a resource and particular transaction (a resource-transaction pair). The baseline values are compared to actual values to determine a deviation for the actual value. Deviation information for the time series data can be reported through an interface or some other manner.

24 Claims, 18 Drawing Sheets

U.S. PATENT DOCUMENTS

| | | |
|---|---|---|
| 2008/0086734 A1 | 4/2008 | Jensen et al. |
| 2008/0114870 A1 | 5/2008 | Pu |
| 2008/0172671 A1 | 7/2008 | Bouillet et al. |
| 2008/0235397 A1 | 9/2008 | Degenaro et al. |
| 2008/0250420 A1 | 10/2008 | Berstis et al. |
| 2008/0270526 A1 | 10/2008 | Barnett et al. |
| 2009/0031066 A1 | 1/2009 | Bansal et al. |
| 2009/0178051 A1* | 7/2009 | Zyuban et al. ............. 718/104 |
| 2009/0235268 A1 | 9/2009 | Seidman et al. |

OTHER PUBLICATIONS

Office Action dated Aug. 31, 2011, U.S. Appl. No. 12/049,840, filed Mar. 17, 2008, 25 pages.

Office Action dated May 23, 2011, U.S. Appl. No. 11/782,346, filed Jul. 24, 2007, 26 pages.

Response A to Office Action dated Jul. 28, 2011, U.S. Appl. No. 11/782,346, filed Jul. 24, 2007, 20 pages.

U.S. Appl. No. 11/782,346, filed Jul. 24, 2007.

U.S. Appl. No. 12/049,840, filed Mar. 17, 2008.

Office Action dated Oct. 17, 2011, U.S. Appl. No. 11/782,346, filed Jul. 24, 2007, 28 pages.

Response B to Office Action dated Jan. 9, 2012, U.S. Appl. No. 11/782,346, filed Jul. 24, 2007, 19 pages.

Final Office Action dated Feb. 14, 2012, U.S. Appl. No. 12/049,840, filed Mar. 17, 2008, 30 pages.

Response A to Office Action dated Nov. 29, 2011, U.S. Appl. No. 12/049,840, filed Mar. 17, 2008, 17 pages.

* cited by examiner

US 8,261,278 B2

AUTOMATIC BASELINING OF RESOURCE CONSUMPTION FOR TRANSACTIONS

BACKGROUND

The growing presence of the Internet and other computer networks such as intranets and extranets has brought about the development of applications in e-commerce, education and other areas. Organizations increasingly rely on such applications to carry out their business or other objectives, and devote considerable resources to ensuring that the applications perform as expected. To this end, various application management techniques have been developed.

One approach for managing an application involves monitoring the application, generating data regarding application performance and analyzing the data to determine application health. Some system management products analyze a large number of data streams to try to determine a normal and abnormal application state. Large numbers of data streams are often analyzed because the system management products don't have a semantic understanding of the data being analyzed. Accordingly, when an unhealthy application state occurs, many data streams will have abnormal data values because the data streams are causally related to one another. Because the system management products lack a semantic understanding of the data, they cannot assist the user in determining either the ultimate source or cause of a problem. Additionally, these application management systems may not know whether a change in data indicates an application or server is actually unhealthy or not.

SUMMARY

The technology described herein determines the health of one or more computing resources used to process a request for an application. Performance data is generated in response to monitoring application execution and includes resource usage data. These resources may include central processing unit (CPU), memory, disk I/O bandwidth, network I/O bandwidth and other resources. The resource data is processed to determine a baseline for resource usage. The baseline data may include predicted or expected resource usage values that are compared to a time series of actual resource usage values. Based on the comparison, a deviation from the baseline value is determined for the actual resource usage. Deviation information for the time series data is then reported, for example to a user through an interface.

In one embodiment, the deviation information may be associated with a deviation range. A number of deviation ranges can be configured to extend from a predicted value of a data point. The actual data point value is contained in one of the ranges depending on how far the actual data point deviates from the predicted value. The deviation information for the actual data point with respect to the predicted data point may be communicated through an interface as an indication of deviation level (e.g., low, medium, high) and updated as additional data points in the time series are processed.

The deviation information may be provided through an interface as health information for a resource. In one embodiment, the interface may provide health and/or performance information associated with resources used by a business application, transaction, or some other computer process. A transaction is a process performed to generate a response to a request, and a business application is a set of transactions.

In an embodiment, an application performs transactions using one or more resources. A first usage of each resource by a transaction is determined. The difference between the first usage and a predicted usage for each resource with respect to the first transaction is then determined and health information for the resources is reported. The health information is reported for each resource with respect to the first transaction and derived from the difference between the first usage and predicted usage.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
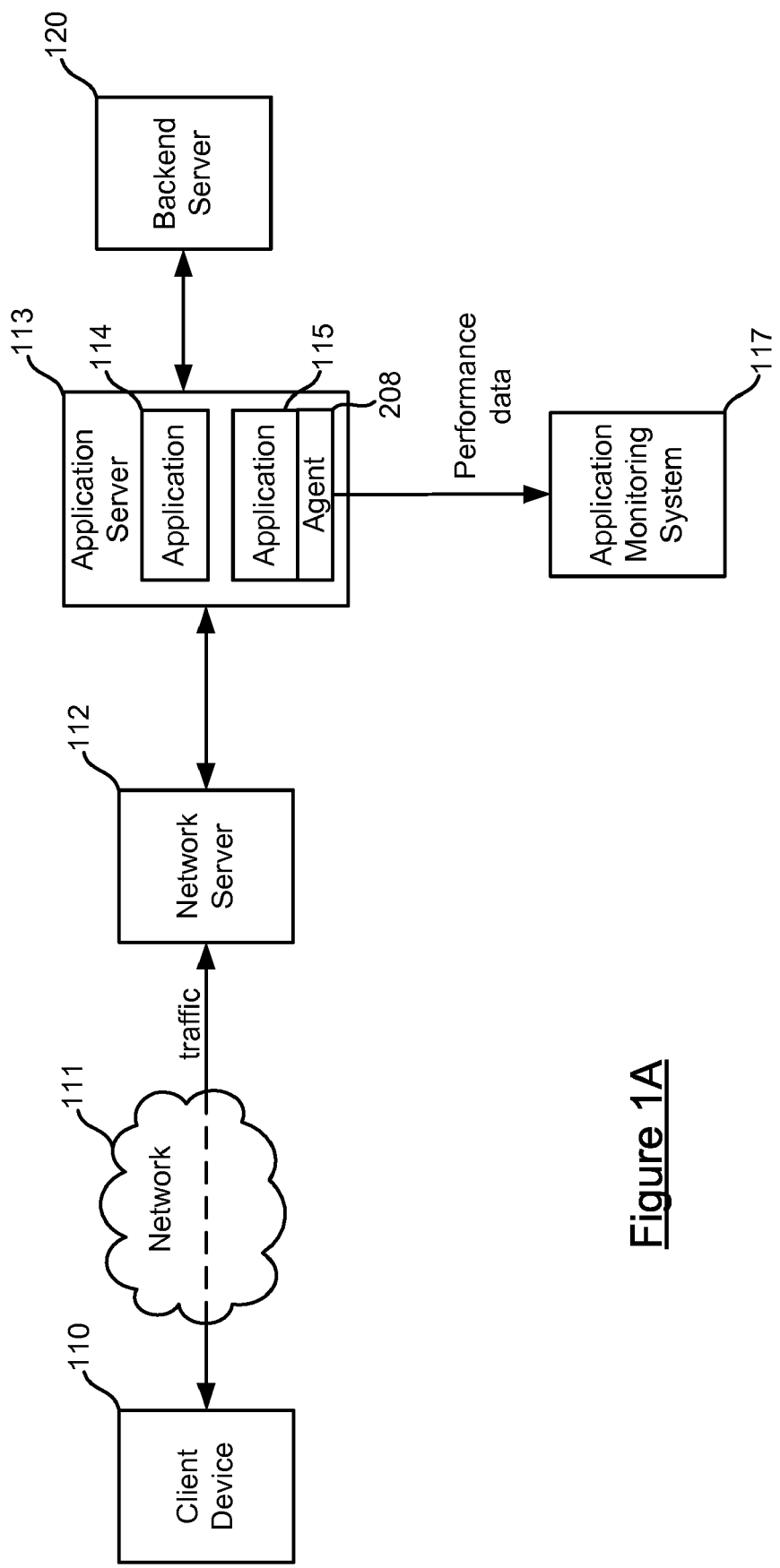
FIG. 1A is a block diagram of an embodiment of a system for determining transaction performance and resource usage.

An application monitoring system determines the health of one or more resources used to process a transaction, business application, or other computer process. An application is executed and monitored, and performance data associated with the application execution is generated. The performance data may include data obtained from an application server operating system, a java virtual machine (JVM) or some other source. A portion of the performance data related to resources is accessed and processed to determine a current resource usage and a baseline resource usage. In some embodiments, the resource usage baseline is predicted or expected resource usage value determined from previous resource usage data, such as a time series. In some embodiments, a resource usage time series of data may be associated with a resource and particular transaction (a resource-transaction pair). The baseline values are compared to actual values to determine a deviation for the actual value. Deviation information for the time series data is reported, for example to a user through an interface. The user may then determine if a resource is unhealthy or not based on the deviation information for the resource and whether application performance is being affected by a resource.

In one embodiment, the deviation information reported to a user is based on a deviation range for the actual data point value. A number of deviation ranges can be generated based on the predicted value. The actual data point will be contained in one of the ranges, wherein the deviation associated with the range is proportional to how far the range is from the predicted value. For example, a range that contains the predicted value may be associated with a low deviation, a range adjacent to the low deviation range may have a medium deviation, and another range adjacent to the medium deviation range may have a high deviation. An indication of which range contains the actual data point value may be presented to a user through an interface and updated as different data points in the time series are processed.

In some embodiments, a deviation range may be selected for a time series data point based on two or more predicted values for the data point. When predicting values, two or more functions may be fit to past time series values and used to calculate future data point values in the series data. Deviation ranges are configured for each predicted value, and each predicted value is contained in one of its corresponding ranges. The different predicted values and corresponding deviation ranges are processed to select an overall deviation range based on highest number of occurrences, degree of deviation, and/or other factors.

In some embodiments, the resource usage may be expressed in terms of a transaction, business application, or some other computer process. A transaction is a set of operations performed to process a request received by an application. The operations may be performed by application components, such as EJBs, servlets and other components, and computer processes invoked by the components, such as a backend, database or other process or system. A business application is a set of transactions defined by a user or in some other manner. In some embodiments, the amount of a resource used for a transaction is determined by monitoring execution of an application that performs the transaction in response to a URL or other request. A request may be a "real" customer request or a synthetic request.

To determine whether resource usage is acceptable, the usage is compared to a baseline. In some embodiments, the utilization of one or more resources can be determined for individual transactions. The utilization of each resource may be based on non-transaction specific usage and transaction specific usage for each resource. The non-transaction specific resource usage is not caused by any particular transaction, but is programmatically attributed to one or more transactions which can be associated with the usage. Once the resource usage for each transaction is known, the current resource usage may be determined and the deviation may be determined.

Resources may include hardware, software, or hardware-software hybrid components of a computing system. Examples of resources include a central processing unit (CPU), memory devices and systems such as RAM, DRAM, SRAM, or other memory, input and output bandwidth for a hard disk, network input and output bandwidth for communicating data (sending and receiving data) with a device or system external to a server (network bandwidth), and other computing system components. Resources are discussed in more detail below.

In some embodiments, an application may perform a transaction by associating the transaction with a thread. Once a thread is associated with a transaction, the resource utilization associated with the thread is determined. Performance data associated with application runtime may be generated based on monitoring classes, methods, objects and other code within the application. The thread may handle instantiating classes, calling methods and other tasks to perform the transaction associated with the thread. The performance data is then reported, in some embodiments the data is aggregated, and the resulting data is analyzed to determine resource usage of one or more resources for one or more individual transactions.

In some embodiments, the resource utilization for a transaction may include the utilization directly related to the transaction. The resource utilization directly related to a transaction may be the use of the resource that is directly caused or required by the transaction. For example, a conceptual transaction may require objects that are thirty bytes in length to be stored in RAM memory and require twenty-five CPU processing cycles to perform the entire transaction. The direct resource utilization for this conceptual transaction is thirty bytes of RAM memory and twenty-five CPU cycles.

Additional resource usage may be incurred indirectly from performance of one or more transactions or a process during which the transactions are performed. For example, a CPU may require thirty-five computer cycles to perform garbage collection. Though this CPU usage is not attributed to any one transaction, this non-transaction specific usage is indirectly associated with transactions that create and store data which eventually becomes "garbage" data. In some embodiments, non-transaction specific resource usage that is not a direct result of a transaction may be apportioned to the one or more transactions it is indirectly associated with. In some embodiments, the additional resource usage may be apportioned to one or more transactions based on the percentage load over a period of time in which the non-transaction specific usage occurred. In other embodiments, the non-transaction specific resource load may be apportioned by URL or in some other manner.

In some embodiments, non-transaction specific resource usage may be associated with a computer process which performs background or overhead resource usage while performing the transactions. For example, a CPU overhead usage may include garbage collection, managing thread and connection pools, time spent doing class loading and method compilation and de-compilation, and other tasks. The overhead may be spent as part of a process or in some other manner. In some embodiments, transactions may be performed as part of a Java Virtual Machine (JVM) process. However, transactions can be performed as part of other processes or on other platforms as well, such as Microsoft's .NET or any managed environment where transactions execute on threads and code can be instrumented. The discussion below references transaction monitoring as part of a JVM process for purposes of example only.

As discussed above, resource usage may be determined for transactions, business applications comprising any number of transactions, or some other process. In the example embodiments discussed below, references are made to determining resource usage for a transaction. It is intended that any references to transaction resource usage can easily be converted to business application (or some other process) resource usage, and such references to a transaction are for purposes of example only.

FIG. 1A is a block diagram of an embodiment of a system for determining transaction performance and resource usage. The block diagram of FIG. 1A includes client device 110, network server 112, application server 113, backend server 120 and application monitoring system 117. Client device 110 and network server 112 communicate over network 111, which may be implemented as a private or public network, the Internet, an intranet, or some other network. In some embodiments, servers 112, 113 and 120 and system 117 may also communicate over a network similar to network 111.

Client device 110 may be implemented as a server, computing device or some other machine that sends requests to network server 112. Network server 112 may provide a network service to client device 110 over network 111. In one embodiment, network server 112 may be implemented as a web server and implement a web service over the Internet. Network server 112 may receive a request from client device 110, process the request and send a response to client device 110. In processing requests, network server 112 may invoke an application on application server 113. The invoked application will process the request, provide a response to network server 112, and network server 112 will provide a corresponding response to client device 110.

Application server 113 includes application 114, application 115 and agent 208. Though not illustrated in FIG. 1A, application server 113 may contain more or less than two applications and any application may be monitored by agent 208 or another agent. Applications 114-115 may process requests received from network server 112. In some embodiments, each of applications 114-115 may process a request by receiving the request, generating a response and sending the response to network server 112. In some embodiments, generating a response by an application may include sending a request to of backend server 120. The application response is then generated based on a response received from the invoked backend server. Application 113 is discussed in more detail below with respect to FIG. 1B.

Agent 208 generates performance data in response to monitoring execution of application 115 and provides the performance data to application monitoring system 117. Generation of performance data is discussed in more detail below. Application monitoring system 117 processes performance data reported by agent 208. In some embodiments, the processing of performance data includes providing resource usage and/or performance information to a user through an interface. Application monitoring system 117 is discussed in more detail below with respect to FIG. 2B.

Backend server 120 may process requests from applications 114-115 of application server 113. Backend servers 120 may be implemented as a database, another application server, or some other remote machine in communication with application server 113 that provides a service or may process requests from an application on application server 113. In some embodiments, backend server 120 may be implemented as a remote system that receives requests from an application, processes the request and provides a response. For example, the backend could be another network service.

Figure 1B:
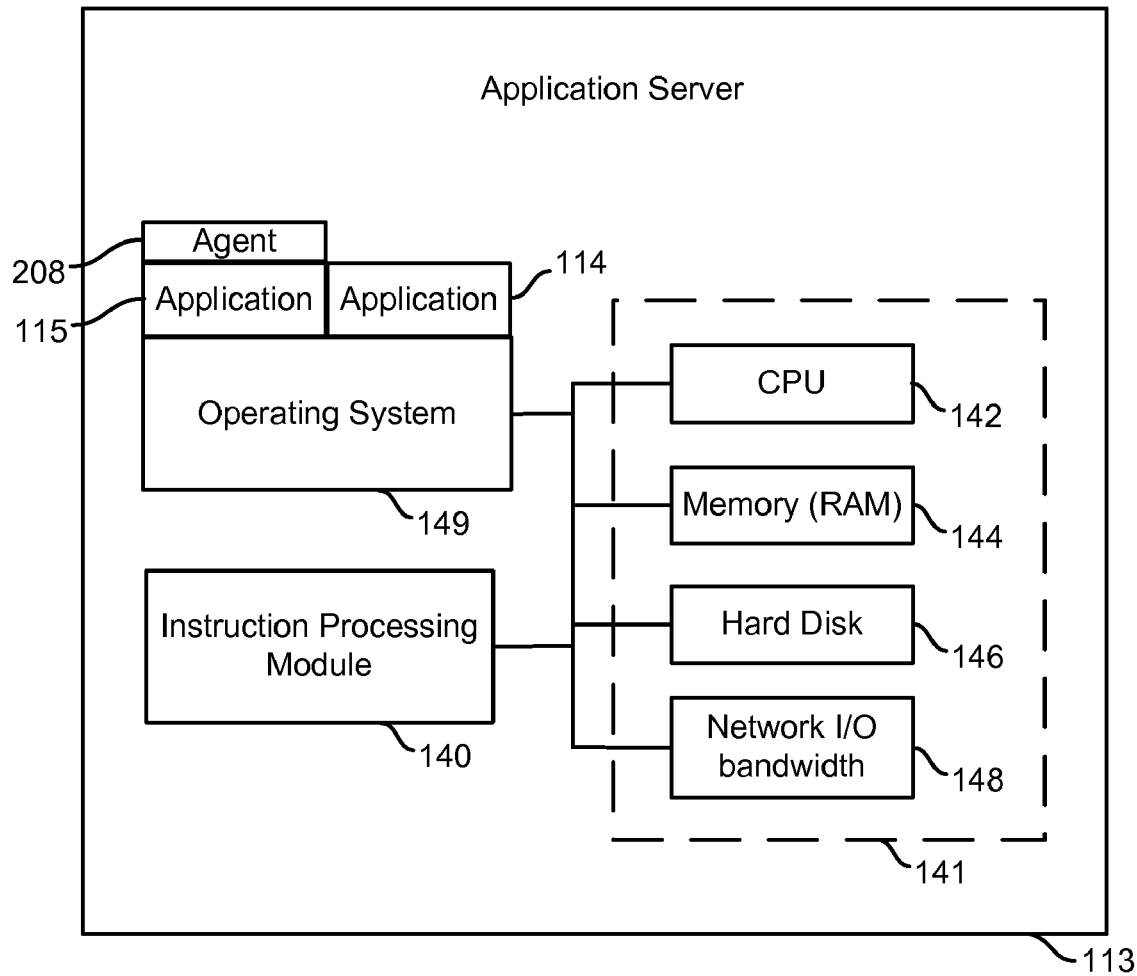
FIG. 1B is a block diagram of an embodiment of a server computer.

FIG. 1B is a block diagram of an embodiment of conceptual application server 113. In some embodiments, application server 113 of FIG. 1B provides more detail for application server 113 of FIG. 1A. Application server 113 includes operating system 149, instruction processing module 140 and resources 141. Resources 141 includes central processing unit (CPU) 142, memory 144, hard disk 146 and network input and output bandwidth (network I/O bandwidth) 148. Each of resources 142-148 may be used to process network requests, including URL requests, and other computer processes received over network 115 by application server 113. In some embodiments, instruction processing module 140 may access any of resources 142-148 while processing instructions to perform a transaction in response to a request received from client device 110. CPU 142, memory 144, hard disk 146 and network I/O bandwidth 148 may each communicate with operating system 149 and instruction processing module 140.

CPU 142 may be implemented by one or more computer processors on application server 113. When processing a transaction, the level of use or utilization of CPU 142 may be measured in terms of processing time (in terms of seconds, milliseconds, microseconds, or some other unit) or computer cycles used to perform the transaction.

Memory 144 is a resource having a finite amount of memory space. Memory 144 may include one or more types of memory, such as RAM, DRAM, SRAM or some other type of memory. Memory 144 can be used to store objects and other data allocated while processing a transaction, storing data during a computer process (such as Java Virtual Machine process), and other data.

Hard disk 146 is a resource implemented as hardware and code for reading from and writing to a hard disk. Hard disk 146 may include hard disk writing and reading mechanisms, code associated with the hard disk and optionally other code and hardware used to read and write to a hard disk on application server 113. Hard disk 146 has a finite reading and writing bandwidth and is utilized by read and write methods, and optionally other sets of code, which perform hard disk read and write operations. The usage of a hard disk resource may be expressed as a bandwidth for writing to and reading from the disk per second, such as seven thousand bytes per second.

Network I/O bandwidth 148 is implemented as code and hardware that operates to communicate to machines and devices external to server 120. For example, network I/O bandwidth 148 may use a number of sockets to communicate with data store 130 and/or other machines external to application server 113. There is a finite amount of network bandwidth for sending and receiving data over network 115 and a finite number of available sockets (i.e., network connections) to communicate to other devices. The usage of network I/O bandwidth may be expressed as a number of bytes sent and received per second, such as ten thousand kilobytes per second.

Resources 142-148 are just examples of elements that may be used to process a transaction. Other resources, computing components, and other hardware and software elements may be used to perform a transaction. The level of use and/or utilization of these other hardware and software elements (on one or more servers) may be determined as well.

Instruction processing module 140 communicates with operating system 149 and resources 141 to execute instructions. The instructions may be executed in response to receiving a request from a user or detecting some other event within application server 113. Operation of instruction processing module 140 is discussed in more detail below with respect to FIG. 1C.

Figure 1C:
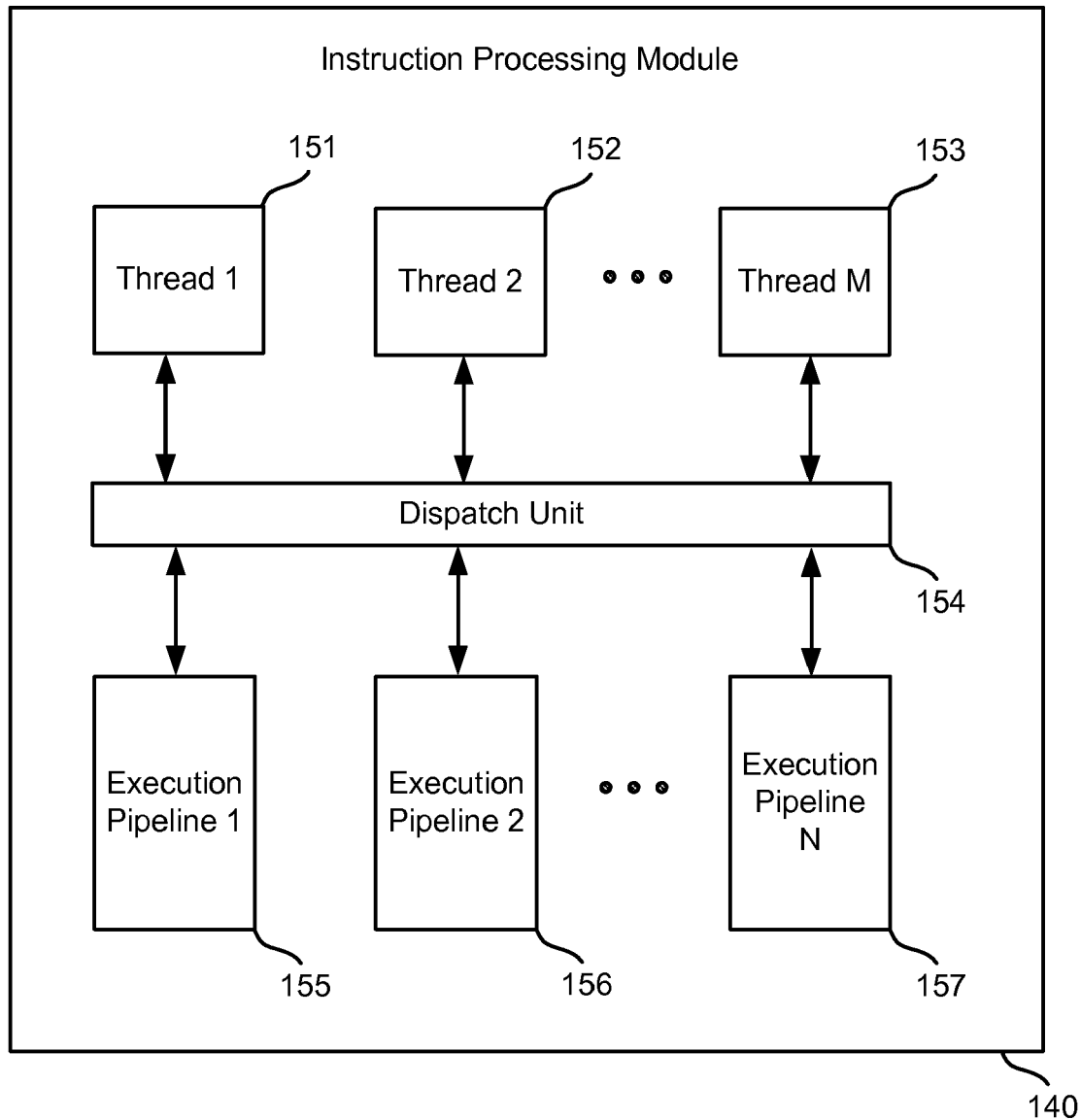
FIG. 1C is a block diagram of an embodiment of an instruction processing module.

FIG. 1C is a block diagram of an embodiment of instruction processing module 140. In some embodiments, instruction processing module 140 of FIG. 1C provides more detail for instruction processing module 140 of FIG. 1B. It should be noted that FIG. 1C is a conceptual illustration of a system for processing instructions by providing a simplified block diagram of an instruction processing system. Additional components used to process instructions may be used but are not illustrated for purposes of discussion.

Instruction processing module 140 includes threads 151, 152 and 153, dispatch unit 154 and execution pipeline 155, 156 and 157. Each of threads 151-153 may contain instructions to be processed as part of performing a transaction. In some embodiments, each thread is associated with a URL and implemented or controlled by a thread object. A thread class may be instantiated to generate the thread object. Dispatch unit 154 may dispatch instructions from one of threads 151-153 to one of available pipelines 155-157. Execution pipelines 155-157 may execute instructions provided by a thread as provided to the pipeline by dispatch unit 154. While executing instructions in an execution pipeline, the pipeline may access any of resources 142-148.

In one embodiment, the technology herein can be used to monitor behavior of an application on an application server (or other server) using bytecode instrumentation. The technology herein may also be used to access information from the particular application. To monitor the application, an application management tool may instrument the application's object code (also called bytecode).

Figure 2A:
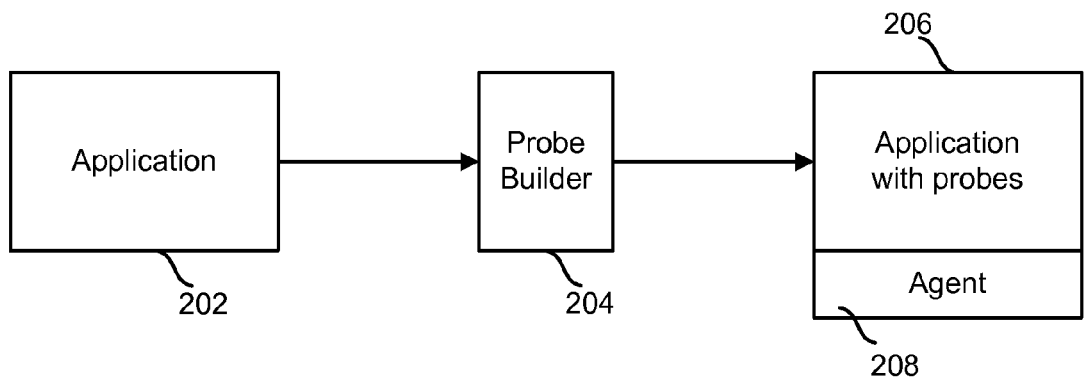
FIG. 2A is a block diagram of a system describing how byte code is instrumented.

FIG. 2A depicts an exemplar process for modifying an application's bytecode. FIG. 2A shows Application 202, Probe builder 204, Application 115 with probes and Agent 208. Application 115 includes probes used to access information from the application, and application 202 is the application before the probes are added. Application 202 can be a Java application or a different type of application.

Probe builder 204 instruments (e.g. modifies) the bytecode for Application 202 to add probes and additional code to Application 202 in order to create Application 115. The probes may measure specific pieces of information about the application without changing the application's business logic. Probe builder 204 also generates Agent 208. Agent 208 may be installed on the same machine as Application 115 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cime, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2B:
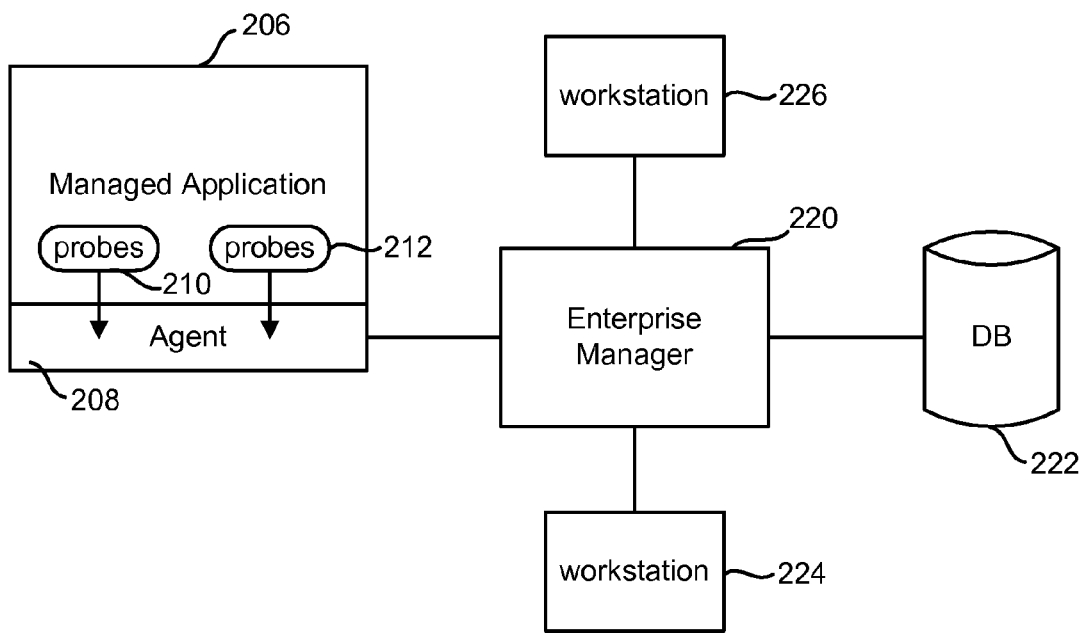
FIG. 2B is a block diagram of a system for monitoring an application.

FIG. 2B is a block diagram of a system for monitoring an application. In one embodiment, the block diagram of FIG. 2B provides more information for managed application 115 and application monitoring system 117 of FIG. 1.

FIG. 2B is a conceptual view of the components of the application performance management tool. In some embodiments, enterprise manager 210, work stations 224-226 and database 222 of FIG. 2B comprise application monitoring system 117 of FIG. 1A. In addition to managed application 115 with probes 206 and 208, FIG. 2B also depicts Enterprise manager 210, database 216, workstation 212 and workstation 214. As a managed application runs, probes (e.g. 206 and/or 208) relay performance data to Agent 208. In one embodiment, probes 206 and 208 may be implemented in objects and other code that write data, change data or otherwise cause the state of an application server to change. In some embodiments, agent 208 may communicate with JVM on application server 113, operations system 149 and other modules on application server 113 to retrieve resource data. Agent 208 then collects, summarizes and sends the data to Enterprise Manager 210.

Enterprise Manager 210 receives performance data from managed applications via Agent 208, runs requested calculations, makes performance data available to workstations 212-214 and optionally sends performance data to database 216 for later analysis. The workstations (e.g. 212 and 214) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In some embodiments, other the natural language tool can be implemented in the console window, explorer window and other windows within an interface.

In one embodiment of the system of FIG. 2B, each of the components is running on different machines. That is, workstation 212 is on a first computing device, workstation 214 is on a second computing device, Enterprise manager 210 is on a third computing device, and Managed Application 115 is running on a fourth computing device. In another embodiment, two or more (or all) of the components are operating on the same computing device. For example, Managed Application 115 and Agent 208 may be on a first computing device, Enterprise manager 210 on a second computing device and a workstation on a third computing device. Alternatively, all of the components of FIG. 2B can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 2C:
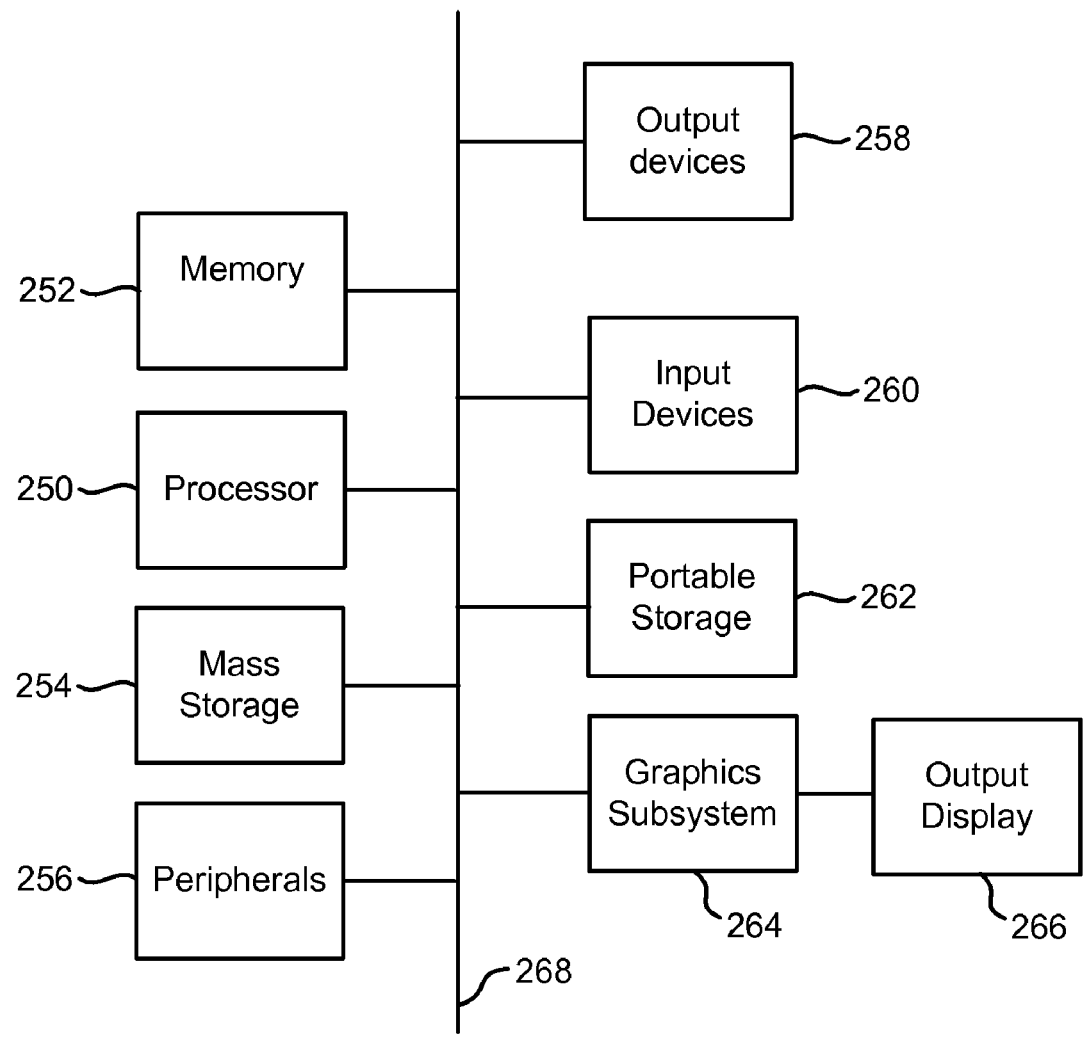
FIG. 2C illustrates a computing system in which the systems of the present invention may be implemented.

FIG. 2C illustrates a computing system in which the system of the present technology may be implemented. In some embodiments, the computing system of FIG. 2C may be used to implement client computer 110, application server 113, data store 130, workstations 224 and 225 and database 222.

The computer system of FIG. 2C includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 2C further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 2C are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present invention for purposes of loading to main memory 252.

Portable storage medium drive 262 operates in conjunction with a portable non-volatile storage medium, such as a floppy disk, to input and output data and code to and from the computer system of FIG. 2C. In one embodiment, the system software for implementing the present invention is stored on such a portable medium, and is input to the computer system via the portable storage medium drive 262. Peripheral device(s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2C includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 2C includes output devices 258. Examples of suitable output devices include speakers, printers, network interfaces, monitors, etc.

The components contained in the computer system of FIG. 2C are those typically found in computer systems suitable for use with the present invention, and are intended to represent a broad category of such computer components that are well known in the art. Thus, the computer system of FIG. 2C can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 3:
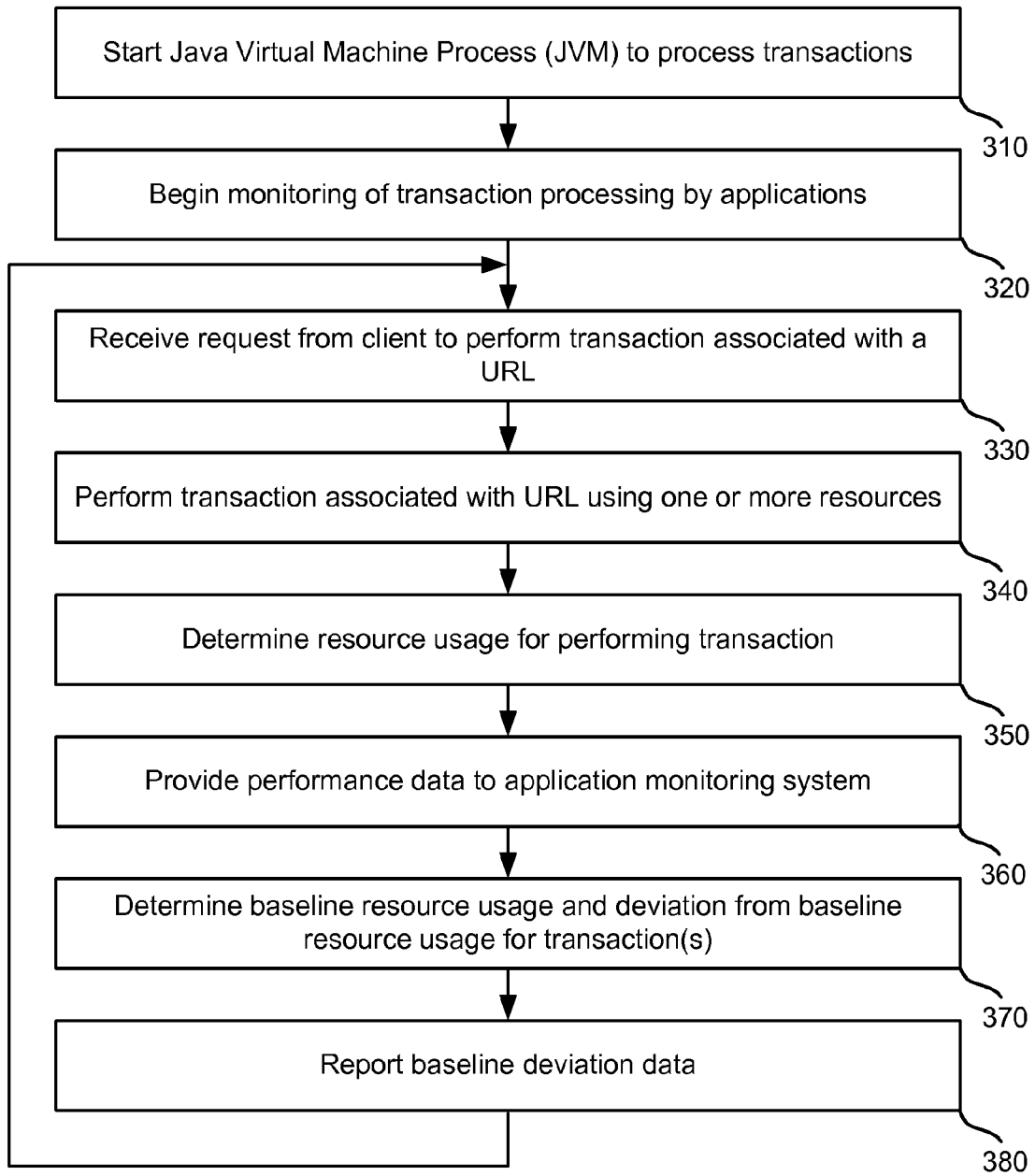
FIG. 3 is a flowchart of an embodiment of a method for determining resource usage deviation.

FIG. 3 is a flowchart of an embodiment of a method for determining resource usage deviation. First, a Java Virtual Machine (JVM) process is started on application server 113 to process transactions at step 310. The JVM process may be a runtime program in which one or more applications that reside on server 120 are executed. In some embodiments, another type of computer process is started. In some embodiments, an application is started without being part of another computer process. Transaction monitoring beings at step 320. Monitoring may begin after tracer code or one or more probes have been inserted into the applications being monitored. In some embodiments, the monitoring code is inserted into an application using byte code instrumentation as discussed above with respect to FIGS. 2A-2B or in some other manner.

Next, a request is received from client 110 by application server 113 to perform a transaction at step 330. In some embodiments, the request is received by another server or machine and causes an invocation of an application on application server 113. The request (or invocation) received by server computer 330 may be forwarded to managed application 206. In some embodiments, the request is a URL request received over network 115 from client 110. In some embodiments, the request is received from some other source external or internal to server 120.

Next, a transaction associated with the received request is performed using one or more resources at step 340. In some embodiments, performing a transaction may include initiating the transaction, assigning the transaction to a thread and performing the transaction using one or more resources. More detail regarding performing a transaction associated with a URL is discussed with respect to FIG. 4.

Resource usage for the performed transaction is determined at step 350. Determining resource usage may involve processing data acquired from one or more probes or sets of tracer code, accessing a JVM, an operating system or some other computing process. Resource usage may be determined for CPU 142, memory 144, hard disk 146, network I/O bandwidth 148, and/or other resources or computing components. In some embodiments, resource usage is determined after performance data is provided to application monitoring system 117. Thus, step 350 may be performed after step 360 in the method of FIG. 3. Determining the utilization and/or level of use of one or more resources is discussed in more detail below with respect to FIGS. 5-10.

Performance data is provided to application monitoring system 117 at step 360. Providing the performance data may include reporting performance data to enterprise manager 210 by agent 116 periodically, such as every fifteen seconds, or based on some other event. The performance data may include resource usage data received by agent 116 from probes and/or tracer code inserted into an application as well as resource usage data retrieved by agent 116 from operation system 149 or a JVM with respect to a resource.

In some embodiments, the performance data (application runtime data) received and reported may contain information for both transaction specific resource usage and data regarding non-transaction specific resource usage. For example, the non-transaction specific performance data reported at step 530 may include CPU time for a JVM process used to process transactions but not associated with a specific transaction (for example, total CPU time for the group of transactions which includes garbage collection CPU time, garbage CPU time only, and so forth). Additionally, the non-transaction specific resource usage reported may also include the total memory space, hard disk bandwidth and network bandwidth attributed to processing transactions by a JVM process for a period of time associated with one or more transactions. In some embodiments, non-transaction specific resource usage data may be retrieved from a JVM, operating system or some other code or process of a machine that contains or has information regarding the resource. This is discussed in more detail below.

The baseline resource usage and deviation from the baseline resource usage for each resource is determined for the performed transaction at step 370. The baseline resource usage for a transaction may be viewed as the actual resource usage by the transaction and non-transaction specific resource usage. For example, non transaction specific CPU usage may include computer cycles used to collect and process garbage. In one embodiment, determining the baseline deviation includes determining how much an actual data point value differs from a predicted data point value for a resource-transaction pair. The deviation may be determined as a Boolean value, a range of values, or in some other manner. Determining a baseline resource usage and baseline deviation is discussed in more detail below with respect to FIG. 11.

Deviation information is reported at step 380. Reporting deviation information may include storing the deviation information in memory, to a hard drive, a data store, or some other storage mechanism, providing the deviation information in a graphical grid, an information window, as an alert, email, page, in a file, to another application or process, or reporting the information in some other manner. In some embodiments, the deviation information is reported to a user through an interface provided through work stations 222 and 224. In some embodiments, the deviation information may provide health information for a particular resource with respect to a transaction or business application. For example, reported baseline deviation information may indicate that CPU usage is at a level of concern for a particular business application comprised of two transactions. For each transaction, the report may indicate that the first transaction has a normal usage of CPU and the second transaction has a higher than normal level of CPU usage. After reporting baseline deviation data, the method of FIG. 3 returns to step 330.

Figure 4:
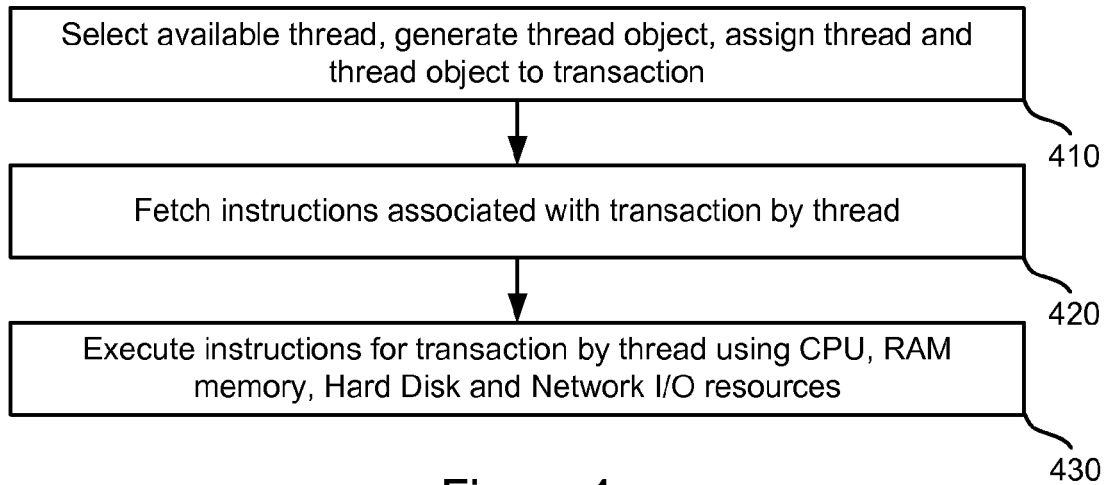
FIG. 4 is a flowchart of an embodiment of a method for performing a transaction using one or more resources.

FIG. 4 is a flowchart of an embodiment of a method for performing a transaction using one or more resources. In one embodiment, the method of FIG. 4 provides more detail for step 340 of the method of FIG. 3. First, an available thread is selected and assigned to a transaction at step 410. The thread may be selected from a thread pool by a thread pool manager in response to receiving the URL request or receiving some other invocation of an application at application server 113. A thread pool and thread pool manager are not illustrated for purposes of simplification. The transaction is then assigned to the selected thread. In one embodiment, the URL associated with the transaction is provided and stored with a thread object associated with the selected thread. A thread object is instantiated from a thread class and generated for each thread used to process a transaction.

A thread fetches instructions associated with the transaction at step 420. Next, the thread executes instructions for the transaction using resources at step 430. The resources may include CPU 142, memory 144, hard disk 146, network I/O bandwidth 148 and/or other resources or computer components. The instructions may be executed by instruction processing module 140 in communication with resources 141. For example, instructions from one of threads 151-153 may be processed in one or more of execution pipelines 155-157.

FIGS. 5-10 illustrate methods for determining the usage of a resource for a particular transaction. In particular, FIGS. 5-7 relate to CPU usage, FIG. 8 relates to memory usage, FIG. 9 relates to hard disk usage, and FIG. 10 relates to network I/O bandwidth usage.

Figure 5:
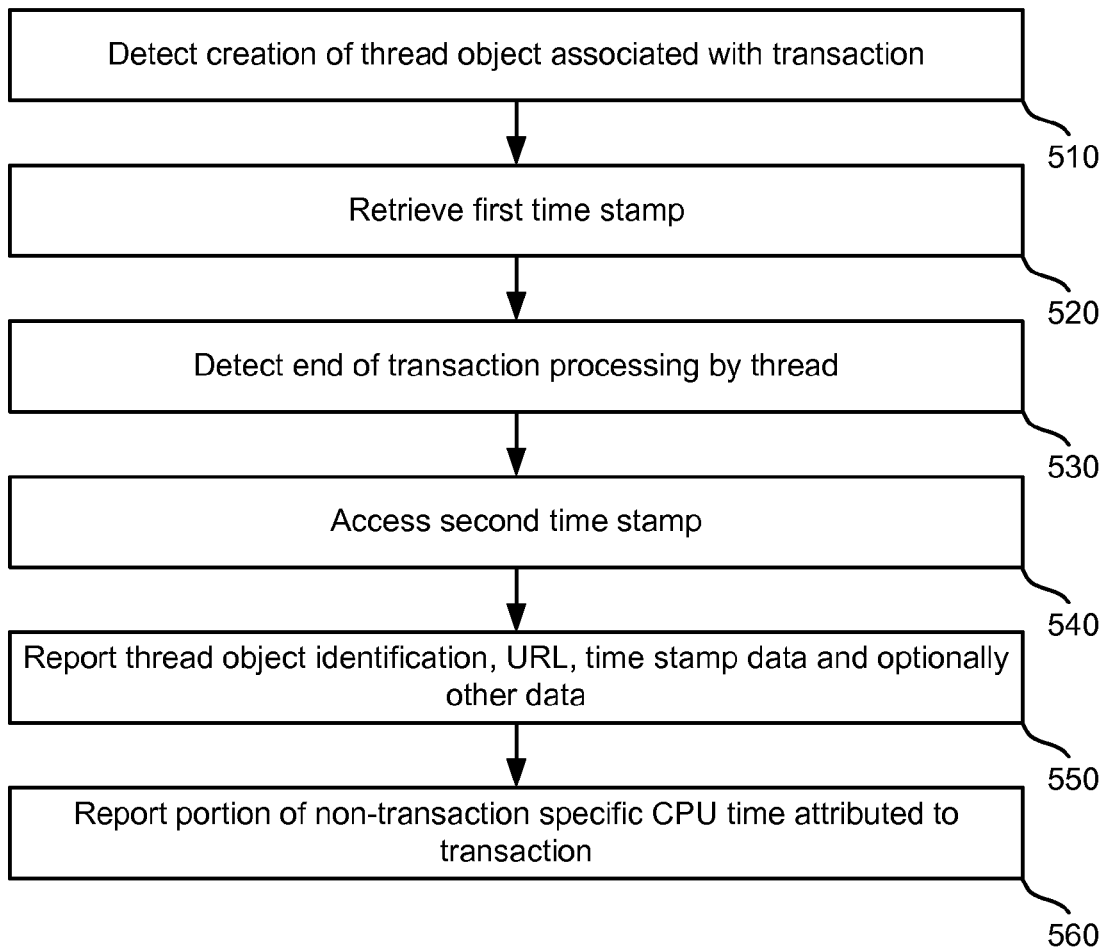
FIG. 5 is a flowchart of an embodiment of a method for determining the level of CPU usage for a transaction.

FIG. 5 is a flowchart of an embodiment of a method for determining a level of CPU usage for a transaction. In some embodiments, the method of FIG. 5 provides more detail for step 350 of the method of FIG. 3. CPU usage may be measured in units of time or cycles. For example, a resource may require a CPU for one millisecond. The unit of time may optionally be converted to computer cycles. For example, one second may be equivalent to 1,000 computer cycles. Determining what units to measure CPU usage in and the particular time-to-cycles conversion factor may be determined based on the particular system or user preference. For purposes of discussion, CPU usage will be discussed below in units of time.

Creation of a thread object associated with a transaction is detected at step 510. In some embodiments, code inserted into a thread class may report when the class is instantiated and a thread object is created. A first time stamp is then retrieved at step 520. The first time stamp is the time at which the thread object is instantiated at step 510.

The end of transaction processing by the created thread is detected at step 530. When a thread object completes processing of a transaction, code inserted into the thread object determines that the transaction is complete. A second time stamp is then accessed at step 540. The second time stamp is associated with the end of the transaction determined at step 530.

Data including a thread object identifier, a URL associated with the thread object, and time stamp data is reported at step 550. The data may be reported by code inserted into the thread object by the thread class (in which monitoring code was inserted at step 510) to agent 208. The time stamp data may be reported as the start and end time of the thread, the difference between the start and end times, or both. In some embodiments, a thread such as a Java thread may handle a single transaction. Thus, the CPU usage directly attributed to the transaction and corresponding URL is the difference between the thread start time and thread end time. In some embodiments, agent 208 may aggregate the data and forward the aggregated data to enterprise manager 210. In some embodiments, additional data may also be reported, such as the thread class, and method used to create the thread object, as well as other data.

CPU usage for a transaction performed in response to a URL request or other request can be measured in other ways as well. For example, monitoring code may retrieve CPU usage data from system calls that provide CPU consumption statistics to a thread. In some embodiment, a thread object may send or otherwise initiate a system call requesting CPU consumption statistics. In some embodiments, the system calls are initiated from a source other than a thread. The operating system, CPU or some other source may then provide CPU data to the thread through one or more system calls. The CPU data may include the percentage of CPU used by the particular thread, the number of CPU cycles used by the thread, and/or other CPU consumption statistics. In some embodiments, the monitoring code traces system calls in which the CPU consumption statistics are provided to a thread. In some embodiments, CPU usage may be measured in cycles, duration, or percentage utilization. With respect to percentage utilization, the total CPU capacity may be 100%, wherein the goal of an administrator may be to keep the percentage utilization at some level or lower, such as 60% or 80% or lower. In some embodiments, the percent utilization of a transaction may be determined by retrieving the percent utilization of the corresponding thread that executes a transaction from the operating system.

After reporting CPU usage directly attributed to the transaction, non-transaction specific CPU time data may be reported at step 560. The portion of the non-transaction specific CPU time includes CPU overhead attributed to the transaction that is not requested by the thread object. A level of "overhead" may be determined for each resource for which usage or bandwidth is attributed to one or more transactions. For example, CPU overhead may include performing garbage collection while processing a number of transactions, managing thread and connection pools, time spent in the JVM doing class loading and method compilation and de-compilation, and other tasks. The non-transaction specific CPU time may be apportioned to one or more transactions by the percent load of time required by each individual transaction. Determining and reporting a portion of non-transaction specific CPU time attributed to a particular transaction is discussed in more detail below with respect to FIG. 6.

Figure 6:
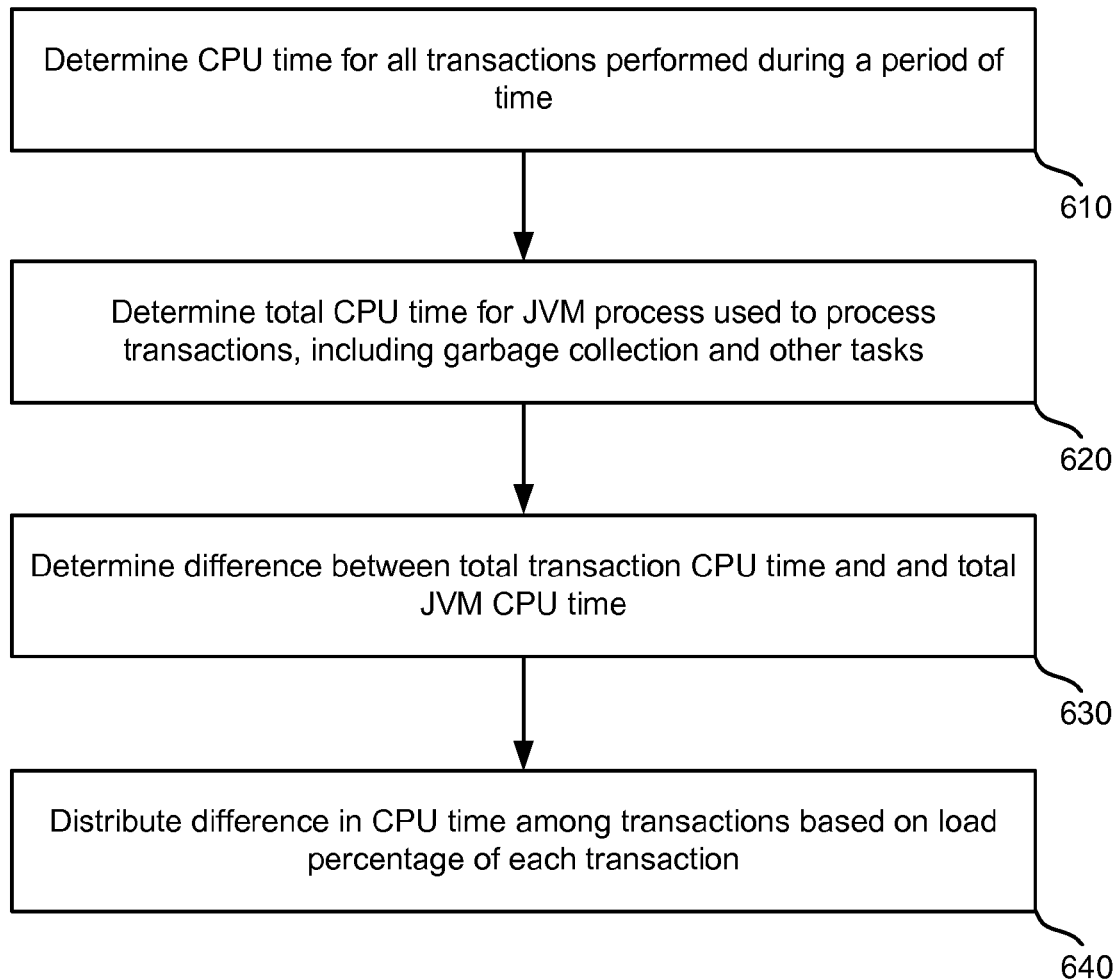
FIG. 6 is a flowchart of an embodiment of a method for determining non-transaction specific CPU usage to attribute to a transaction.

FIG. 6 is a flowchart of an embodiment of a method for determining non-transaction specific CPU usage to attribute to a transaction. In some embodiments, the method of FIG. 6 provides more detail for step 560 of FIG. 5. The total CPU time is determined for the transactions performed during a period of time at step 610. The period of time may be a set by a user, the length of a JVM process or other process, or some other period of time. In some embodiments, the time period may be a learning period during which the resource usage for each transaction is monitored. In general, the learning period is flexible for any resource, and could be in terms of minutes, hours, days, or some other period of time. In some embodiments, setting a short time period (less than an hour) may not allow enough time for a desired variety of customer transactions and non-transaction specific CPU usage to be observed and reported. The CPU time for all transactions may include a sum of the times for each transaction and transactions processed by shared threads. In one embodiment, the total CPU time is the sum of the times for each transaction performed as part of a JVM process, other computer process, or during a specific time period of a JVM process.

Next, the total CPU time for the JVM process used to process the transactions is determined at step 620. The total JVM process CPU time may be the time for the entire JVM process or for a selected period discussed with respect to step 610. The CPU usage during the JVM process may include CPU time used to perform the transactions and other tasks, such as garbage collection. When the CPU usage is a length of a JVM process, the time of the JVM process CPU time may be determined by retrieving the data from operating system 149, software associated with CPU 142 or from some other source. When the CPU usage is the number of computing cycles associated with a JVM process, the number of cycles may be retrieved from operating system 149 or some other module on server 120.

The difference between the total transaction CPU time and the JVM process CPU time is determined at step 630. To determine the difference, the total transaction CPU time is subtracted from the JVM process CPU time. Next, the difference in the CPU time determined at step 630 is distributed among transactions that occurred during the JVM process based on the load percentage of each transaction at step 640. The transaction load percentage is determined by dividing the transaction CPU time by the total transaction CPU time. The transaction's portion of the extra CPU time is then determined as the load percentage for the transaction multiplied by the extra CPU time. Step 640 is discussed in more detail with respect to the method of FIG. 7.

Figure 7:
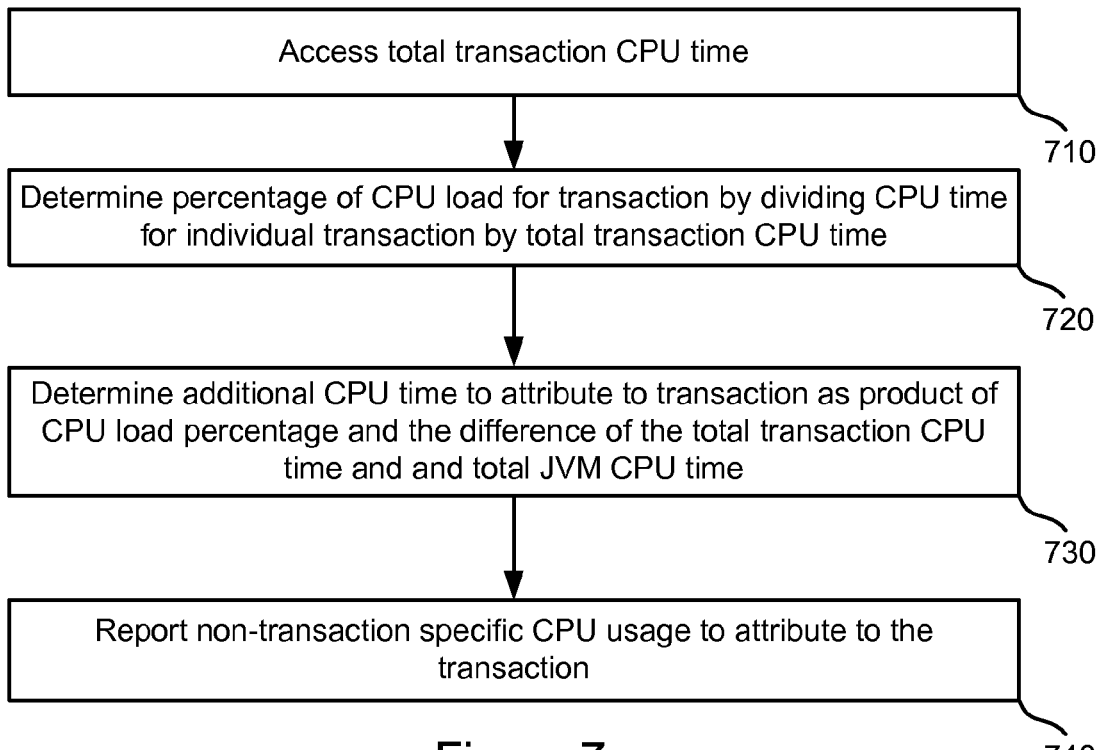
FIG. 7 is a flowchart of an embodiment of a method for calculating a percentage of CPU time for a percentage of the transaction.

FIG. 7 is a process for determining a transaction CPU load percentage and provides more detail for an embodiment of implementing step 640 of the method of FIG. 6.

First, the total transaction CPU time is accessed at step 710. The CPU load percentage for a transaction is determined by dividing the CPU time for the individual transaction by the total transaction CPU time at step 720. For example, consider transactions T1, T2, and T3. T1 uses five milliseconds of a CPU resource, T2 uses six milliseconds of a CPU resource and T3 uses four milliseconds of a CPU resource. The total transaction CPU time is determined as the sum of the CPU time for the three transactions, or fifteen milliseconds (5 ms+6 ms+4 ms=15 ms). The load percentage for transaction T1 is determined as five milliseconds divided by fifteen milliseconds, or 33% (5/15=⅓).

The additional CPU time to attribute to the transaction is determined by the product of the CPU load percentage for the transaction and the difference between the total transaction CPU time and the total JVM process time at step 730. Assume the JVM process has a total CPU time of eighteen milliseconds. Accordingly, the non-transaction specific CPU time is determined as fifteen milliseconds subtracted from the total JVM process CPU time of eighteen milliseconds, resulting in three milliseconds (18−15=3). The portion of CPU time apportioned to transaction T1 is 33% times three milliseconds, or one millisecond (⅓×3=1). The additional non-transaction specific CPU time is then reported at step 740. The non-transaction specific CPU time may be reported separately or together with the transaction specific CPU time reported in step 550 of the method of FIG. 5. The method of FIG. 7 may be generalized to determine the transaction use load percentage of other resources as well, such as memory, disk I/O and network I/O.

Figure 8:
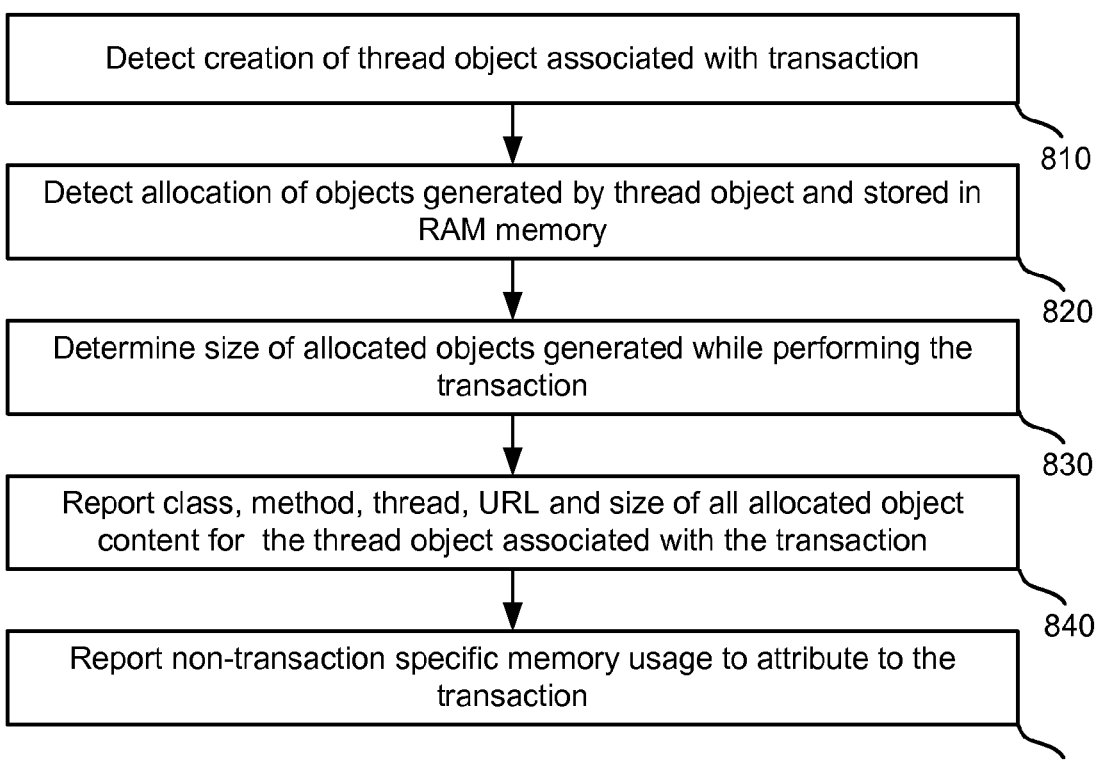
FIG. 8 is a flowchart of an embodiment of a method for determining the usage of a memory resource by a transaction.

FIG. 8 is a flowchart of an embodiment of a method for determining the usage of a memory resource by a transaction. In some embodiments, the method of FIG. 8 provides more details for step 350 of the method of FIG. 3 with respect to memory 144. In one embodiment, memory usage may be considered in terms of size of memory used, including RAM, DRAM, SRAM and other memory. In general, threads may create objects while performing a transaction. The memory usage for transaction may be expressed as the size of memory required to contain the objects allocated by the thread performing the transaction.

First, creation of a thread object associated with a transaction is detected at step 810. Detecting the creation of the thread object at step 810 is similar to detecting a thread object created via instantiation of a thread class discussed with respect to step 510 of FIG. 5. Next, the allocation of objects generated by a thread and stored in memory 144 as part of performing a transaction is detected at step 820. The thread associated with the transaction will create objects and save them to memory 144 as part of performing a transaction. Creation of these objects is detected while performing the transaction by probes or tracer code in the application performing the transaction.

The size of the allocated objects generated while performing the transaction is determined at step 830. The size of the allocated objects may be determined manually or automatically. Determining a size of an allocated object manually involves determining the size of primitives and other object content within each generated object. An object may have a basic framework and one or more variables that require memory space when stored to memory 144. For example, the general object framework may require thirty-two bytes. Different types of primitives may require different sizes of memory, for example, four bytes for an integer type, eight bytes for a long type, two bytes per character in a string type, and other content may require other bytes of data. The data sizes given are for example only; other variables and variable sizes may be used. When an object instantiates another object, the instantiated object size is also considered part of the object measured as part of a chain of allocation at step 830.

The size of an allocated object may also be measured automatically. In some embodiments, a method may be invoked to automatically determine how much memory space an allocated object requires. For example, in Java 1.5 Platform, a method "getObjectSize" may be invoked with a parameter "objectToSize" specifying the allocated object. The method then returns the size of the allocated object. The method may be part of the "Instrumentation" interface of Java 1.5 Platform.

After determining the size of allocated objects generated by a thread, the thread class, method, thread object identifier, URL associated with the thread and size of all the allocated object content for the thread is reported at step 840. In some embodiments, monitoring code within the application may retrieve the URL from the thread object associated with the transaction and thread processing the transaction. The data may be reported to agent 208 which may then report performance data to enterprise manager 210. In some embodiments, the performance data may be aggregated or otherwise processed by agent 208 before being provided to enterprise manager 210.

Next, the portion of the non-transaction specific memory usage to attribute to a transaction is reported at step 850. Some objects may be created and stored in memory 144 while one or more transactions are processed but may not be associated with a particular transaction. The total size of these objects is apportioned among the transactions which are processed during the time the object was created. The time period may be determined by a user, associated with a computer process, such as a JVM process, or some other time period.

To calculate the non-transaction specific memory usage for a transaction, the difference between the total transaction memory space and the total JVM process memory space used, for a period of time shorter than the JVM if applicable, is determined. The total JVM process memory space may be retrieved from operating system 149, software or some other system associated with memory 144, or some other source. The difference in memory space is then distributed among the transactions based on the memory size load for each transaction. The percentage load of total memory can be determined similar to that for CPU percentage load with respect to FIG. 7. For example, if a first object requires twenty bytes, the total object memory space for a JVM process requires two hundred bytes, and the non-transaction specific memory usage is thirty bytes, then the percentage load of the first object is ten percent and the non-transaction specific memory usage to attribute to the first object is three bytes.

Figure 9:
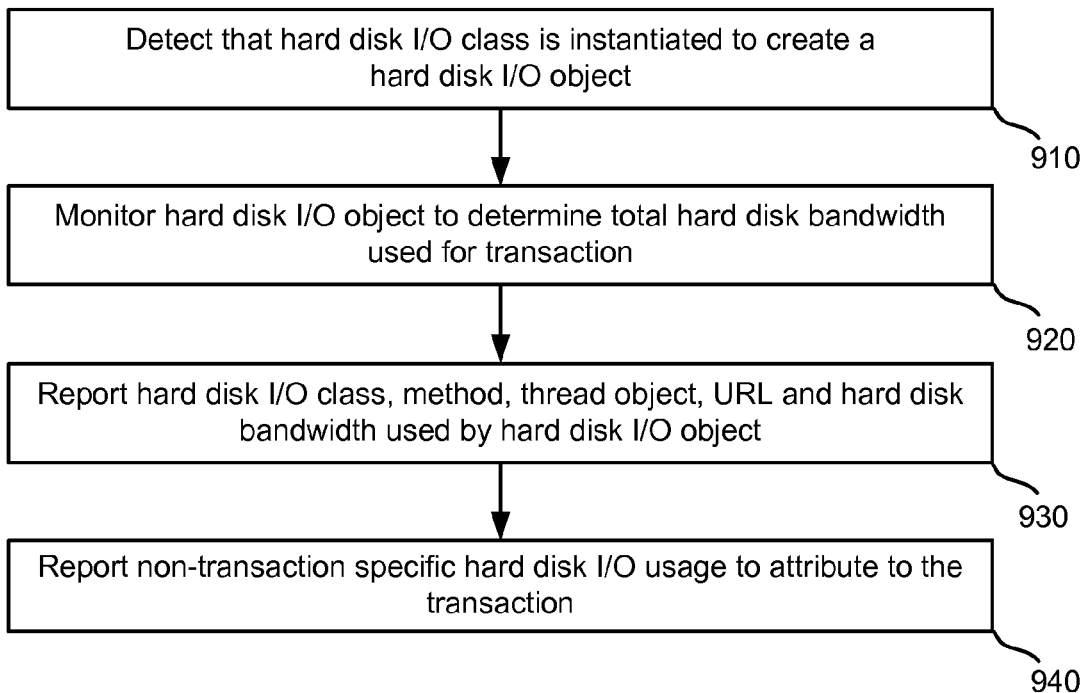
FIG. 9 is a flowchart of an embodiment of a method for determining hard disk bandwidth used for a transaction.

FIG. 9 is a flowchart of an embodiment of a method for determining hard disk bandwidth used for a transaction. In some embodiments, the method of FIG. 9 provides more detail for step 350 of FIG. 3 with respect to hard disk bandwidth. Hard disk bandwidth is determined in terms of the amount of data written to and read from hard disk 146 in bytes of data per second during transaction execution.

First, the instantiation of a hard disk I/O class is detected at step 910. The hard disk I/O class is instantiated to create a hard disk I/O object. Creation of the object may be detected by monitoring code placed in the hard disk I/O class. Several classes and/or methods may be used to read and write to a hard disk. In some embodiments, monitoring code can be placed in several classes and methods associated with performing a write or read operation with respect to hard disk 146. The monitoring code may then add code to the hard disk I/O object when the class is instantiated. For example, one hard disk I/O class which may be modified to include monitoring code is "java.io.fileinputstream."

Hard disk I/O objects are then monitored to determine the amount of hard disk bandwidth used by the object at step 920. As discussed above, the hard disk bandwidth used is the amount of data read from or written to hard disk 146 per second. The hard disk I/O object is monitored by code placed in the object by monitoring code inserted into the object class. In some embodiments, a thread object may also be monitored to detect creation of the hard disk I/O object and the size of the data written to and from hard disk 146 from the thread.

Next, the hard disk I/O class, method used to write the data, thread object identifier, URL and hard disk bandwidth used by the hard disk I/O object are reported at step 930. Optionally, other data may be reported as well, such as the data length of the read and write operations performed. The data may be reported to agent 208. Agent 208 receives the data, optionally aggregates the data, and provides performance data to enterprise manager 210. The data may be reported to enterprise manager 210 as it becomes available or periodically, such as every fifteen seconds or some other time period.

A portion of the non-transaction specific hard disk bandwidth attributed to the current transaction is determined and reported at step 940. Determining the non-transaction specific hard disk bandwidth utilized involves determining the hard disk bandwidth required for a process which includes transaction execution but not associated with the particular transaction itself. This hard disk bandwidth can be apportioned to one or more transactions by a percentage of the hard disk bandwidth load per transaction or in some other manner. Determining and reporting non-transaction specific hard disk bandwidth to attribute to a transaction involves calculating the total hard disk bandwidth usage and the JVM hard disk usage for a period of time. A portion of the difference in the two usages for the period of time is then allocated, for example by load percentage, to the transaction. For example, if a first transaction had a hard disk bandwidth usage of 8000 bytes per second and the total hard disk bandwidth usage for transactions of the JVM process was 40000 bytes per second, the first transaction would be attributed with twenty percent (8000/40000=20 percent) of the difference of hard disk bandwidth usage.

Figure 10:
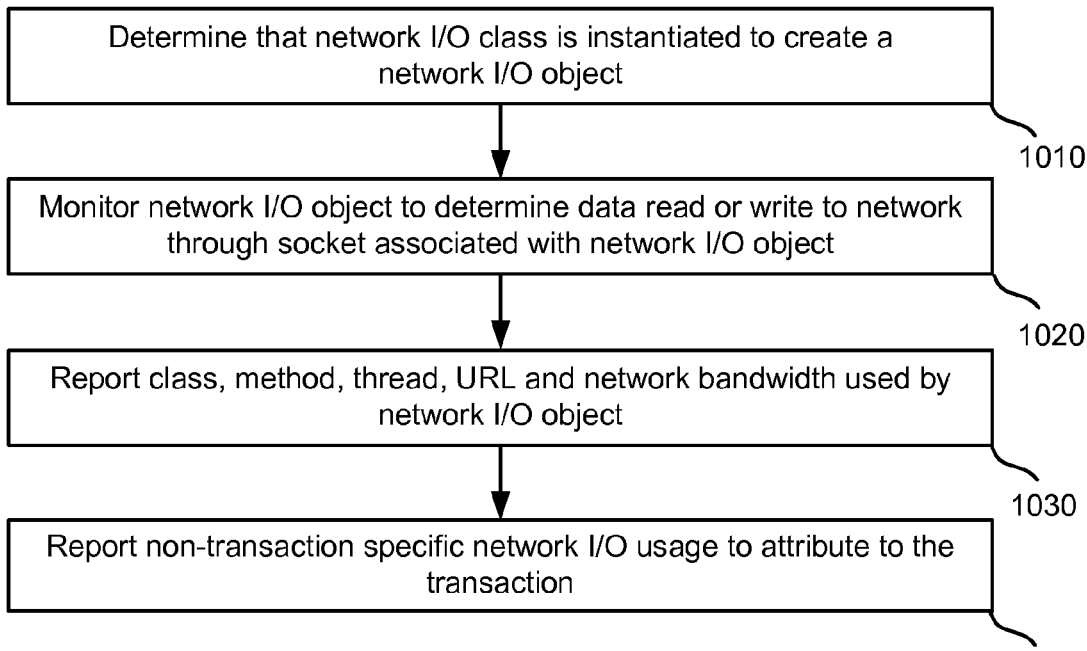
FIG. 10 is a flowchart of an embodiment of a method for determining a network bandwidth for a transaction.

FIG. 10 is a flowchart of an embodiment of a method for determining network bandwidth required for a transaction. In some embodiments, the method of FIG. 10 provides more detail for step 350 of FIG. 3 with respect to network input and output bandwidth for server 113. Network bandwidth is a resource in terms of the amount of data that can be sent and received by server 13 over network 112, or some other network, in terms of bytes of data per second.

First, the instantiation of a network I/O class is detected at step 1010. The network I/O class is instantiated to create a network I/O object. Creation of the object may be detected by monitoring code placed in the network I/O class. Several classes and/or methods may be used to send and receive data over network 115. In some embodiments, monitoring code can be placed in several classes and methods associated with performing a network data send or receive operation. The monitoring code may then add code to the network I/O object when the class is instantiated.

Network I/O objects are then monitored to determine the network bandwidth used by the network I/O object at step 1020. The network I/O object is monitored by code placed in the object by monitoring code inserted into the object class. In some embodiments, a thread object may also be monitored to detect creation of the network I/O object and the amount of data send to or a device over network 115 by the thread. As discussed above, the network bandwidth required for transaction execution is the amount of data received and sent over a network as a direct result of executing the transaction.

Next, the network I/O class, method used to send or receive the data, a thread object identifier, URL, the network bandwidth and optionally other data are reported at step 1030. The network bandwidth may be reported as length of data sent or received through a data stream or other network data. Agent 208 may receive the reported data, optionally aggregate the data, and provide performance data to enterprise manager 210. The data may be reported to enterprise manager 210 as it becomes available or periodically, such as every fifteen seconds.

The non-transaction specific network bandwidth attributed to the current transaction is determined and reported at step 1040. Determining the non-transaction specific network bandwidth utilized by a transaction is similar to the process for determining the non-transaction specific hard disk bandwidth used. In particular, determining and reporting non-transaction specific network bandwidth for a transaction involves calculating the total network bandwidth usage and the JVM network usage for a period of time and allocating a portion of the difference in the two usages to the transaction.

Figure 11:
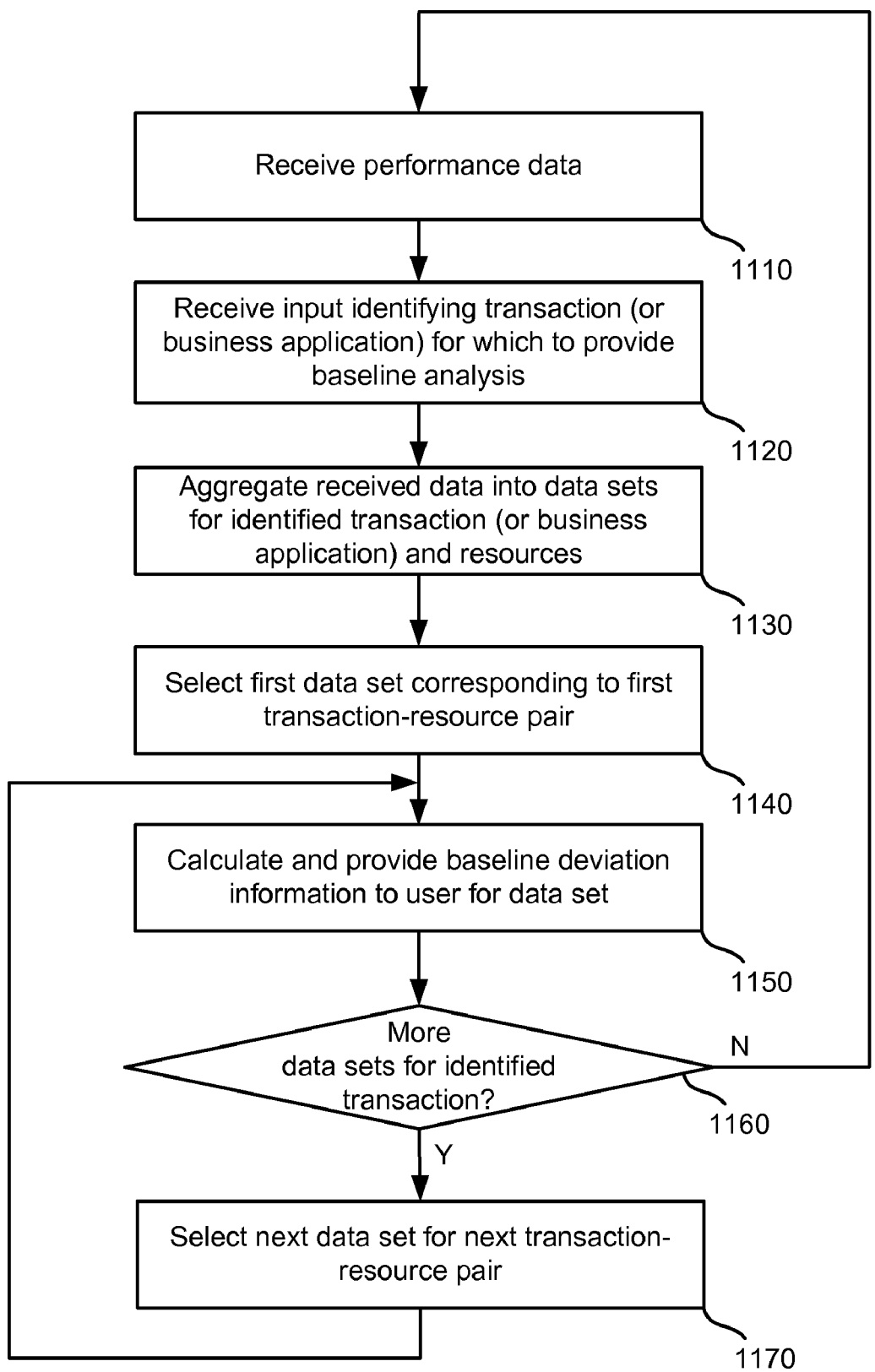
FIG. 11 is a flow chart of an embodiment of a method for providing application performance information to the user.

FIG. 11 is a flow chart of an embodiment of a method for determining baseline resource usage and deviation from baseline resource usage for a performed transaction. In some embodiments, the method of FIG. 11 provides more detail for step 370 of the method of FIG. 3 and may be performed by application monitoring system 117.

Performance data is received at step 1110. The performance data may be received by Enterprise manager 210 from agent 208 of application monitoring system 117. Input may then be received which identifies the transaction or business application for which to report baseline analysis at step 1120. The baseline analysis may indicate the resource usage with respect to a baseline for the identified transaction or business application. As discussed above, a business application is a set of applications, and therefore can be defined as part of step 1120.

The identified data is aggregated into data sets by application and resource at step 1130. In some embodiments, there is one data set per transaction-resource pair. When data is reported for a defined business application, a data set may be reported for a business application-resource pair. In this case, the data for the transactions that comprise the business application are used to determine resource usage for the business application. For example, if there is aggregated data for four different transactions which use four different resources, there will be sixteen different data sets. The data set may comprise a time series of data, such as a series of CPU cycle values that are determined over a set period of time.

A first data set is selected at step 1140. The selected data set may be one of several data sets corresponding to a transaction for a particular time period. Baseline deviation information is calculated and provided to a user for the selected data set at step 1150. In some embodiments, step 1150 includes predicting a value (i.e., a baseline) for each data point in the data set, determining a deviation of the actual data point value from the predicted data point value, providing the deviation information for the data point to a user and repeating the process for the remaining data points in the data set. Calculating and providing baseline deviation information to a user for a data set is discussed in more detail below with respect to FIG. 12.

A determination is made as to whether more data sets exist of the identified transaction at step 1160. As discussed above, there may be several data sets for the application identified at step 1120. If more data sets exist to be processed, the next data set is selected at step 1170 and the method of FIG. 11 returns to step 1150. If no further data sets exist to be processed, the method of FIG. 11 returns to step 1110 where another batch of performance data is received from Agent 208 by Enterprise Manager 210. In some embodiments, an additional batch of performance data may be received periodically from agent 208, such as every 15 seconds.

Figure 12:
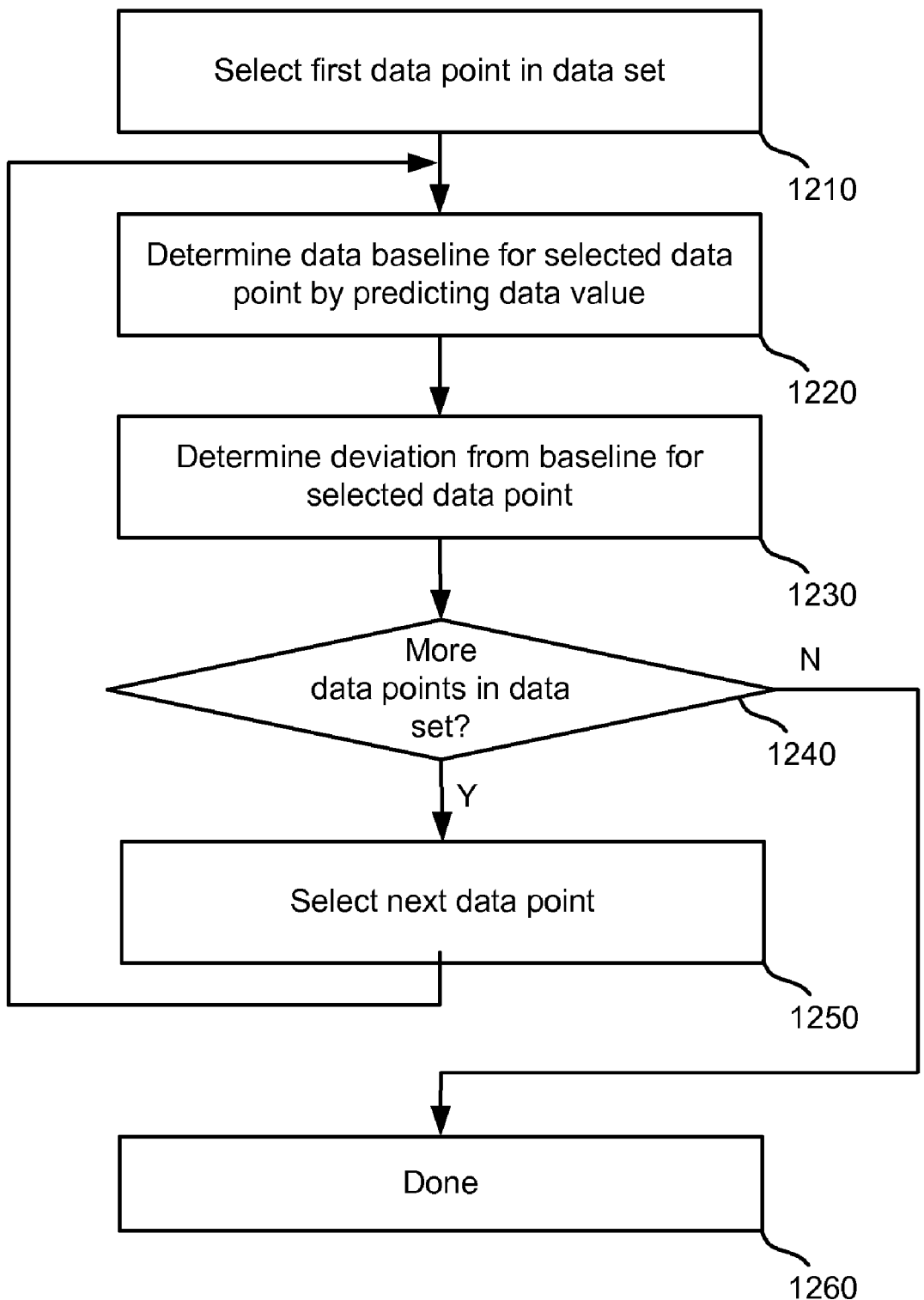
FIG. 12 is a flow chart of an embodiment of a method for calculating resource baseline deviation information.

FIG. 12 illustrates a flow chart of an embodiment of a method for calculating and providing baseline deviation information to a user. In one embodiment, the method of FIG. 12 provides more detail for step 1150 of the method of FIG. 11.

First, a first data point is selected in the selected data set at step 1210. A baseline for the selected data point is then determined by predicting the value of the data point at step 1220. In this case, the data point value is predicted based on previous data values in the current data set or a previous data set. The baseline can be determined using one or more functions applied to previous or current performance data. Determining a baseline for a selected data point by predicting a data point value is discussed in more detail below with respect to the method of FIG. 13.

The deviation of the current data point from the determined baseline is determined at step 1230. Determining the deviation includes comparing an expected baseline value for the data point to the actual value of the data point and characterizing the difference. For example, the difference may be identified within a normal range of deviation or outside the normal range of deviation. Determining deviation from a baseline value for a selected data point is discussed in more detail below with respect to FIGS. 14-16.

Next, a determination is made as to whether additional data points exist in the data set to be processed at step 1240. If no more data points exist in the current data set, the method of FIG. 12 is done at step 1260. If more data points exist in the data set, the next data point is selected at step 1250 and the method of FIG. 12 returns to step 1230 where baseline data is determined for the currently selected data point.

Figure 13:
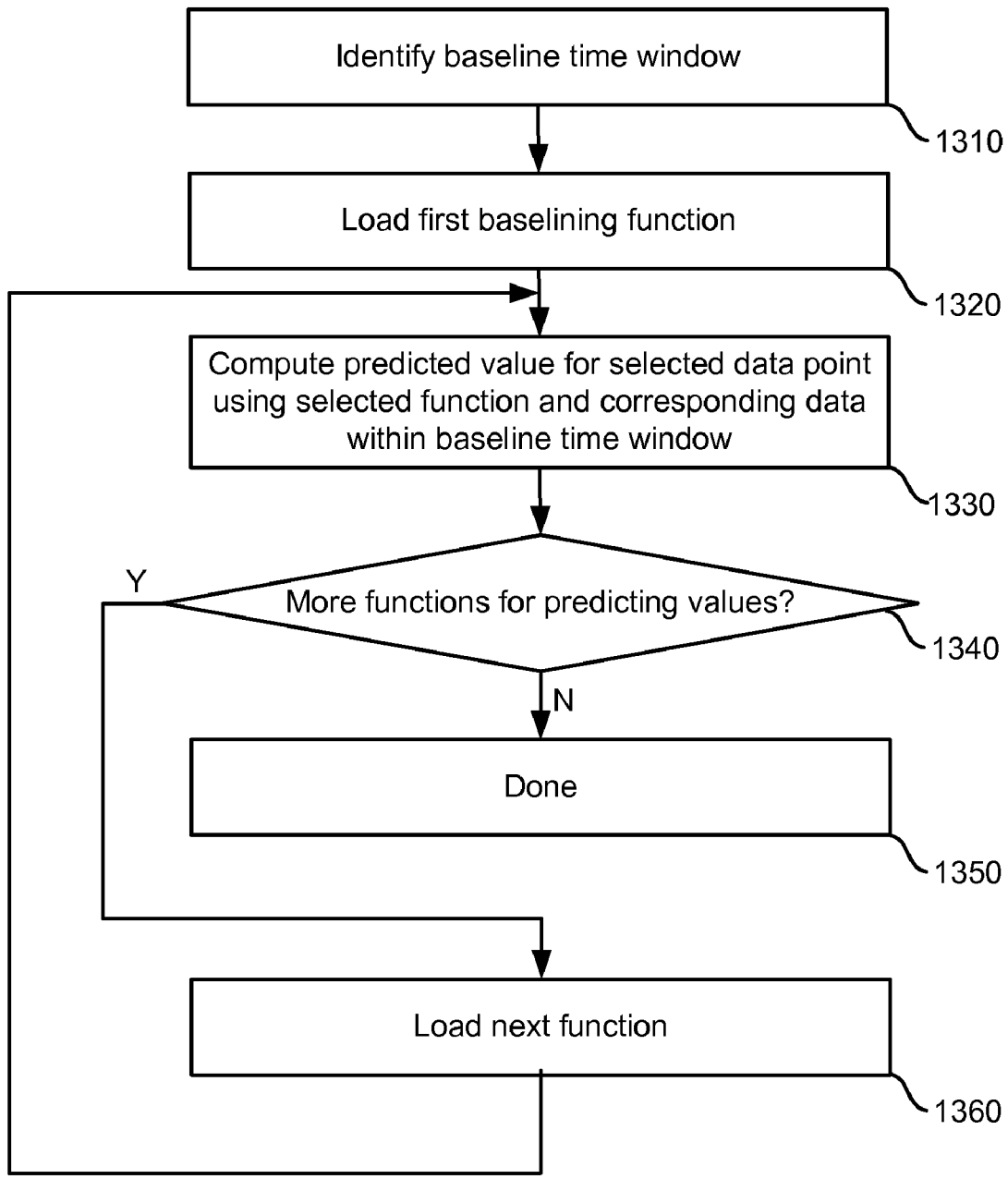
FIG. 13 is a flow chart of an embodiment of a method for determining a baseline value for selected a data point.

FIG. 13 is a flow chart of an embodiment of a method for determining a baseline value for a selected data point value. In some embodiments, the method of FIG. 13 provides more detail for step 1230 of the method of FIG. 12. First, a baseline time window is identified at step 1310. The time window is a period of time over which data will be used to determine a baseline. The time window may be static or dynamic with respect to different baselines and may or may not include data points within a particular data set. A static time window doesn't change for calculating different baselines; it is the same period of time for all baseline calculations. For example, a static time window may be the first hour of time that an application was monitored. A dynamic time window may change based on the time of the baseline calculation, the baseline being determined or other factors. For example, a dynamic time window may be a window of thirty minutes before the baseline is determined.

A first function used to generate a baseline is loaded at step 1320. The function may be one of a set of several functions used to predict the data point value. The set of functions can include different types of functions, the same function type tuned with different constants, or a combination of these. In some embodiments, any of several functions which may be fit to a time series of data may be used to generate a baseline. In some embodiments, data set data points may be processed using two or more functions to determine a baseline. In some embodiments, once the functions are selected for the first data set, they may be used in subsequent data sets as well. In embodiments, a different set of functions may be used for different data sets, such as data sets associated with a different application or a different resource.

Several types of functions providing statistical models of an application performance data time series may be used with the present technology. Examples of statistical models suitable for use may include simple moving average, weighted moving average, single exponential smoothing, double exponential smoothing, triple exponential smoothing, exponentially weighted moving average, Holt's linear exponential smoothing, Holt-Winters forecasting technique, and others. In some embodiment, selecting one or more functions may include selecting the functions from a group of functions. For example, the five (or some other number) best fitting functions which best fit the first data set may be selected from a group of ten functions. Selecting functions and fitting functions to data, and predicting a data point is discussed in U.S. Pat. No. 7,310,590, filed on Dec. 15, 2006, entitled "Time Series Anomaly Detection using Multiple Statistical Models," having inventor Jyoti Bansal, and is hereby incorporated by reference.

A predicted value for the selected data point is computed for the selected function at step 1330. Computing the baseline value may be done using any of several functions as discussed above. For example, fitting functions to a data set may include determining function constants. The constants may be determined from the first data set and enable each function to be fit to the first data set.

After computing a baseline value for the data point using the current function, a determination is made as to whether more functions exist for predicting a baseline value at step 1340. If more functions exist for determining a baseline value, the next function is loaded at step 1360 and the method of FIG. 13 returns to step 1330 where a new baseline value is computed using the selected function. If more functions do not exist for predicting values, the method of FIG. 13 is complete at step 1350.

Figure 14:
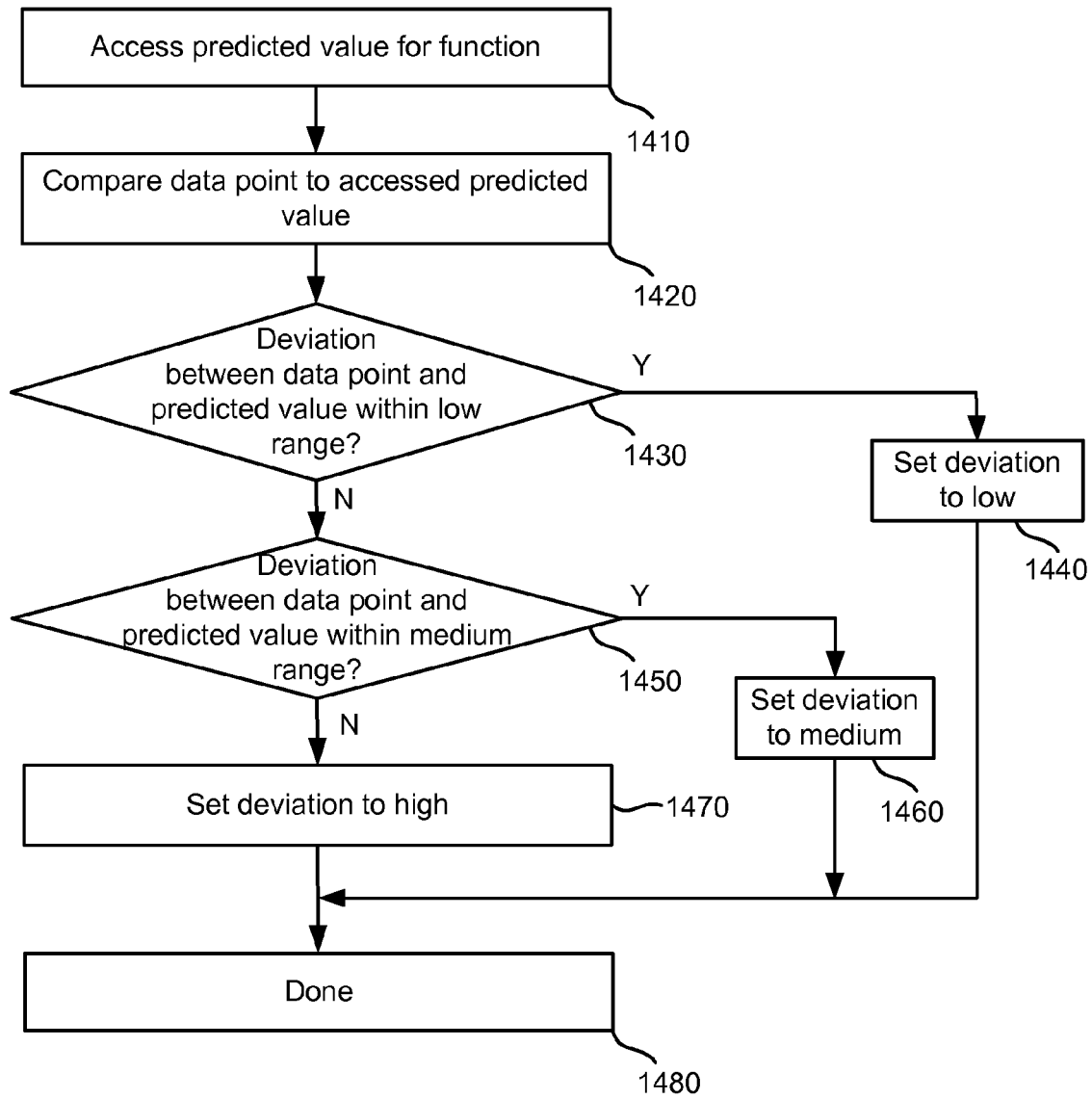
FIG. 14 is a flow chart of an embodiment of a method for determining deviation level for data point.
Figure 15:
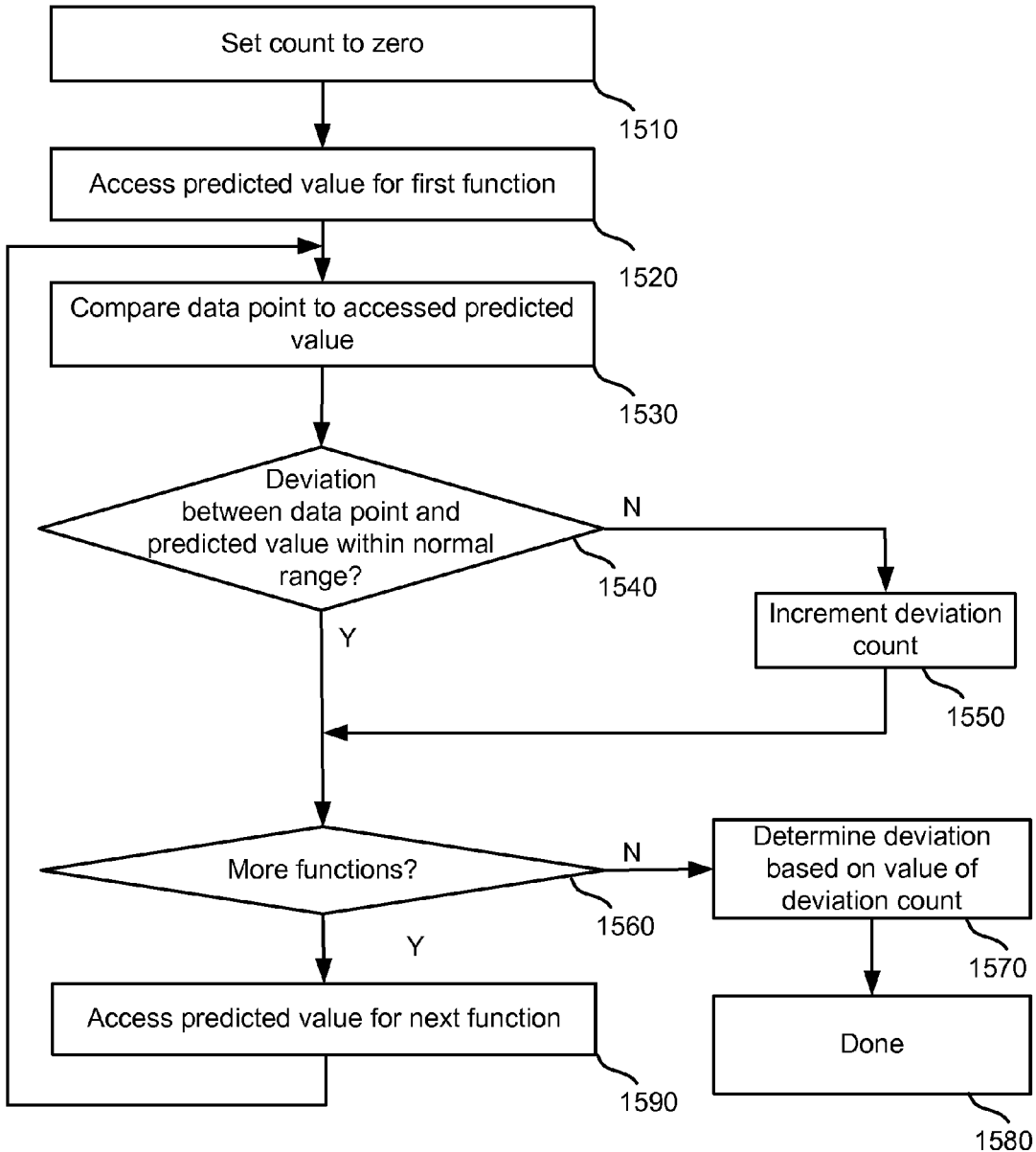
FIG. 15 is a flow chart of an embodiment of a method for determining deviation count for data point.
Figure 16:
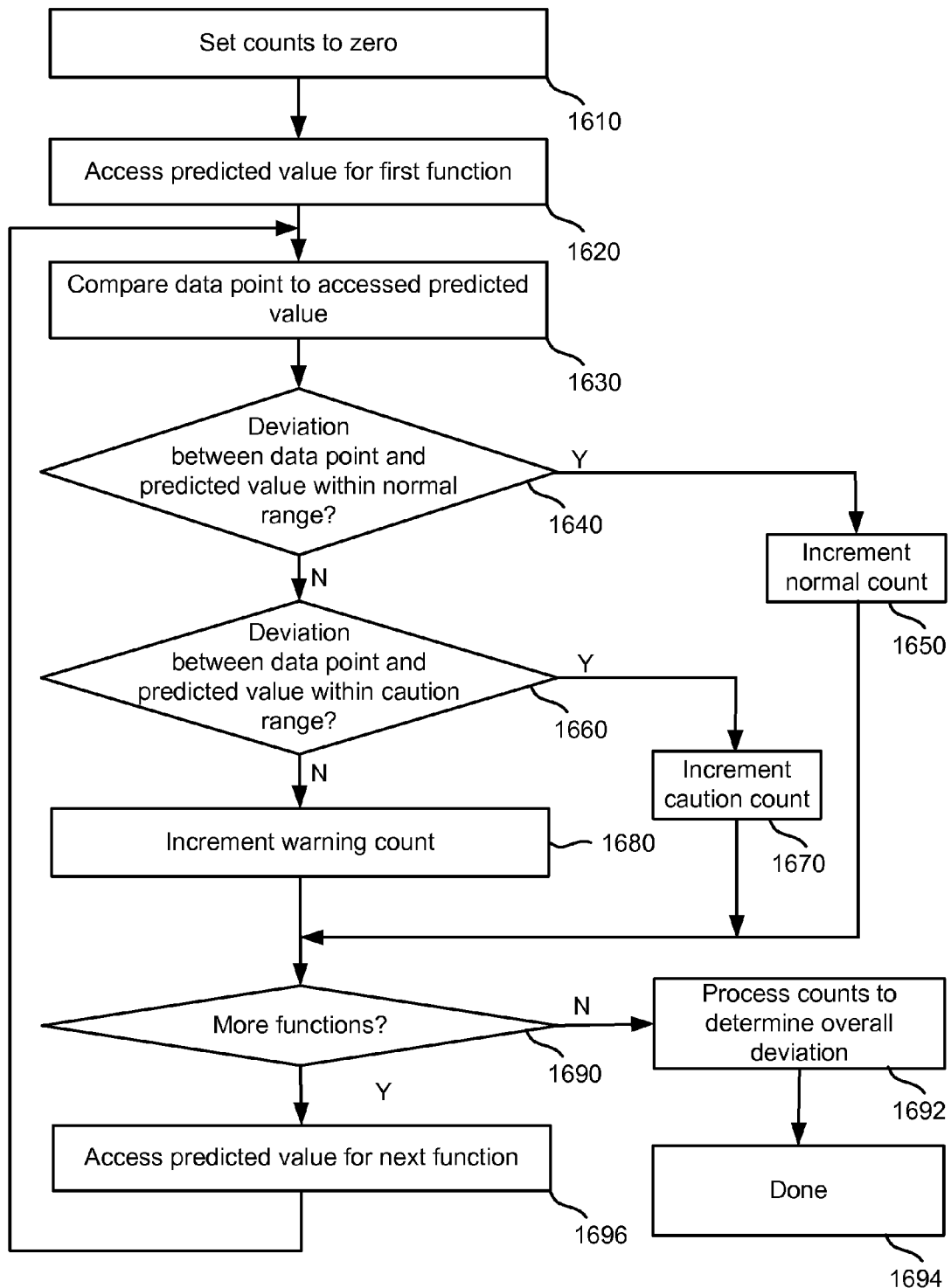
FIG. 16 is a flow chart of an embodiment of a method for determining deviation notification for data point.

FIGS. 14-16 illustrate different embodiments for determining deviation information for a data point. In one embodiment, the processes of FIGS. 14-16 each provide an example of more detail for step 1240 of FIG. 12. The different embodiments may determine deviation information using a different number of functions, use different methods for selecting a deviation range, and differ in other ways. These illustrated embodiments are intended as examples of possible implementations and other embodiments for determining deviation information are within the scope of the present technology.

FIG. 14 is a flow chart of an embodiment of a method for determining deviation level for a data point. The embodiment described by the method of FIG. 14 uses one function to determine the deviation of an actual data point from an expected data point and provides more detail for an embodiment of step 1240 of the method of FIG. 12.

First, a predicted value for a function is accessed for the next data point at step 1410. The predicted value is the baseline value determined at step 1330 in the method of FIG. 13. Next, the actual data point value is compared to the accessed value at step 1420. A determination is then made as to whether the difference between the actual data point value and the predicted data point value is within a low deviation range at step 1430. In one embodiment, a low deviation range has a small deviation, if any. The low range may be configured as up to 10% deviation of the predicted value, a standard deviation from the data points in the data series, or some other range selected by a user. In some embodiments, the range may be determined automatically by the system herein. If the data point difference is within the low deviation range at step 1430, the deviation is set to low at step 1440 and the method of FIG. 14 ends at step 1480.

If the deviation is not within the low range of deviation, a determination is made as to whether the difference between the actual data point value and the predicted data point value is within a medium range at step 1450. A medium range may be configured as between 10% and 20% deviation of the predicted value, between the standard deviation and twice the standard deviation, or some other range of values. If the deviation is within a medium range, the deviation for the data point is set to medium at step 1460 and the method of FIG. 14 ends at step 1480. If the deviation is not within the medium range at step 1450, the deviation is shut to a high range at step 1470 the method of FIG. 14 ends.

FIG. 15 illustrates a flow chart of an embodiment of a method for determining deviation count for data point. In one embodiment, the method of FIG. 15 provides more detail for step 1240 of the method of FIG. 13. First, a count is set to zero at step 1510. In some embodiments, the count represents a number of times that a data point value falls outside the low deviation threshold associated with each predicted data point value. A predicted value of a data point associated with a first function is accessed at step 1520. Next, the actual data point value is compared to the accessed data point value at step 1530. The accessed data point value is the baseline value calculated in the method of FIG. 13.

A determination is made as to whether the deviation between the actual data point value and the predicted data point value is within a threshold at step 1540. In one embodiment, the threshold may be the limit of a low deviation range, such as 10% of the predicted value, a standard deviation, or some other value. If the deviation is not within the threshold, the count is incremented at step 1550. After incrementing the count, the process continues to step 1560. If the deviation is within the threshold, the method of FIG. 15 continues to step 1560.

A determination is made as to whether more functions are used to predict the current data point at step 1560. If more functions exist, a data point value predicted by the next function is accessed at step 1590. The method of FIG. 15 then returns to step 1530 where the actual data point value is compared to the predicted data point value for the next function. If no more functions exist which were used to predict a data point value for the current data point, the deviation is determined based on the value of the deviation count at step 1570. In some embodiments, a count of 20-50% of the number of functions used to predict the data point may indicate a medium range of deviation. A count having a value of 50% or more of the number of functions used to predict the data point may indicate that the deviation is within a high deviation range. For example, if six functions were used to predict a data point value and the actual data point value is outside the threshold for two of the six predicted values, this corresponds to 110% and a medium deviation range. If the actual data value is outside the threshold for four of the six predicted data values, the deviation range associated with the actual data point would be a high deviation range. The method of FIG. 15 is then complete at step 1580.

FIG. 16 illustrates a flow chart of an embodiment of a method for determining deviation notification for a data point. In one embodiment, the method of FIG. 16 provides more detail for step 1240 for the method of FIG. 12. First, two or more counts are set to zero at step 1610. In the embodiment of FIG. 16, a count is used for each of a low deviation range, medium deviation range and high deviation range. The counts are used to keep track of the number of actual data point values that differ by the corresponding deviation (low, medium, high) from their predicted data point value. A predicted value for a first function is accessed at step 1620. The predicted data point value is the value predicted by the method of FIG. 13. Next, the actual data point value is compared to the accessed value associated at step 1630.

A determination is made as to whether the difference between the actual data point value and the predicted data point value are within a low deviation range at step 1640. The low deviation range may be configured as ten percent of the predicted value, a standard deviation from the predicted value, or in some other manner. If the deviation is within a low deviation range at step 1640, a low count is incremented at step 1650 and the method of FIG. 16 continues to step 1690. If the deviation is not within the low range, a determination is made as to whether the deviation between the actual data point value and predicted data point value is within a medium deviation range at step 1660. If the deviation is within the medium range, a medium count is incremented at step 1670 and the method of FIG. 16 continues to step 1690. If the deviation is not within the medium range at step 1660, the data point value is in a high deviation range, a high count is incremented at step 1680 and the method of FIG. 15 continues to step 1690.

A determination is then made as to whether more functions were used to predict data points for the actual data point at step 1690. If more functions were used, a predicted value generated by the next function is accessed at step 1696. The method of FIG. 14 then returns to step 1630 where the accessed predicted data point value is compared to the actual data point value.

If no more functions were used to predict values for the current data point, the counts are processed to determine the overall deviation at step 1692. In some embodiments, the count (of the low, medium and high count) which has the largest value is selected as the corresponding range associated with the data point. Thus, if the low count has a value of one, the medium count has a value of three, and the high count has a value of one, the current data point will be associated with a medium deviation range. The method of FIG. 16 is then complete at step 1694.

In some embodiments, a count may be incremented by a value greater than one in the embodiments of FIGS. 15-16 or other embodiments that use counts. A process may be used to weight the increment value when a particular function is trusted or more closely resembles a time series than other functions used to predict values of the time series. For example, if a function appears to represent a time series with a low deviation for a certain period of time, the increment value for the function may be weighted to increment a counter more than normal if the actual data point value differs from the predicted data point value. In some embodiments, the increment associated with a function may be weighted if the difference calculated between the last hundred (or some other number) actual data points and the data points predicted by a function has been less than a threshold value. Thus, a determination may identify whether the function has a history of accurately predicting values for the times series.

A time series may experience an increase or decrease in values over time that may not be due to application or resource heath. For example, in some embodiments, different functions can be used to analyze a time series for different periods of time. For example, an application which generates a time series may experience more activity (for example, receive more traffic) during business hours, or more activity on weekdays then weekends. The change from a recognized busy period to a less busy period (e.g, Friday to Saturday, or 5 p.m. to 6 p.m.) may cause a change in the time series data which could be mistaken as an anomaly. In this case, the change would be due to a change in application activity level, not due to an anomaly caused by degraded application health or performance. Thus, the anomaly detection system may be configured to utilize different functions at activity periods or to adjust the functions to better approximate the changed time series as the application activity changes. This "normalization" of the system may be used to reduce false alarms that may appear as a deviation of concern but are actually just a reflection of expected increased activity or load on an application or the particular resource.

Figure 17:
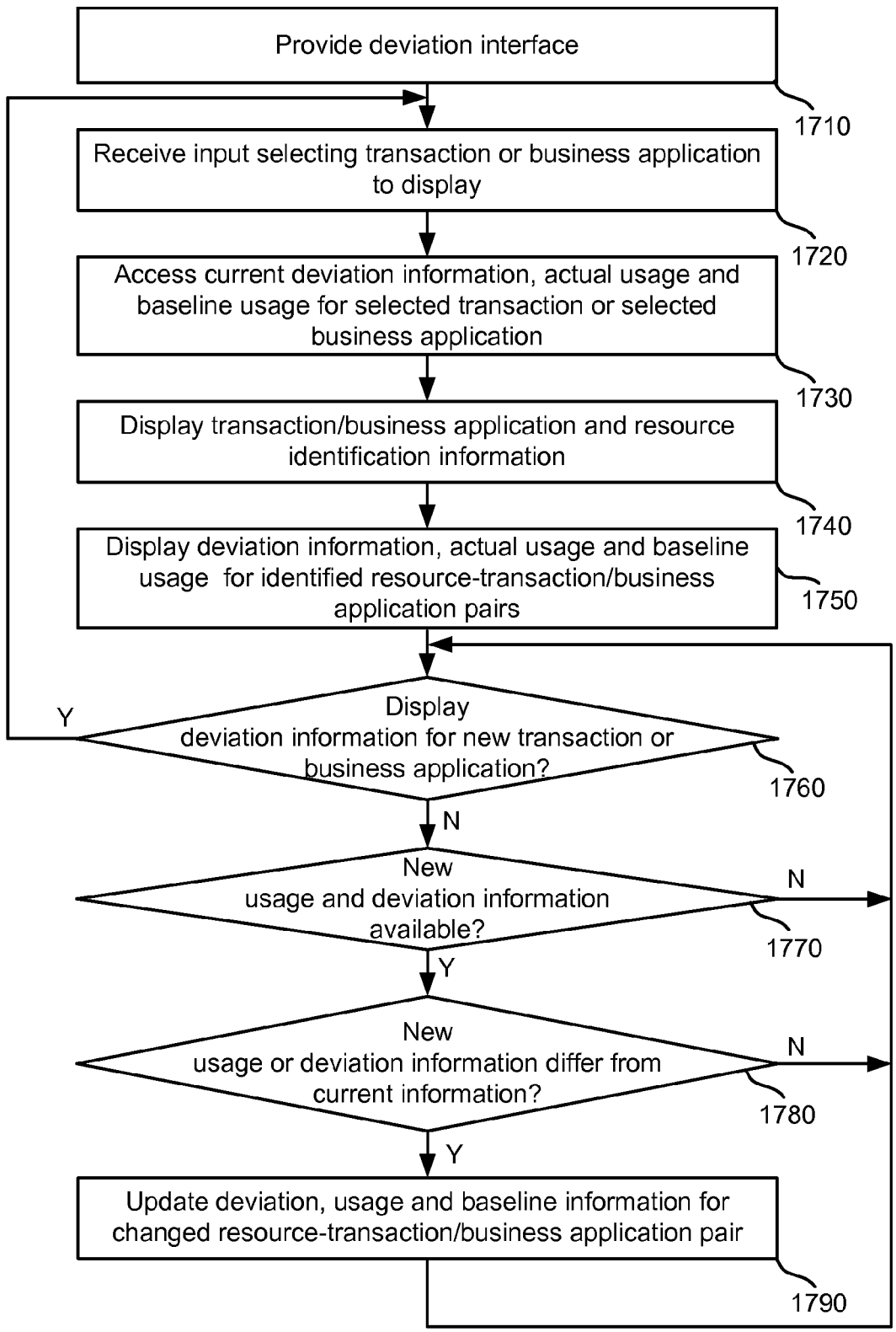
FIG. 17 is a flow chart of an embodiment of a method for reporting baseline deviation information.
Figure 18:
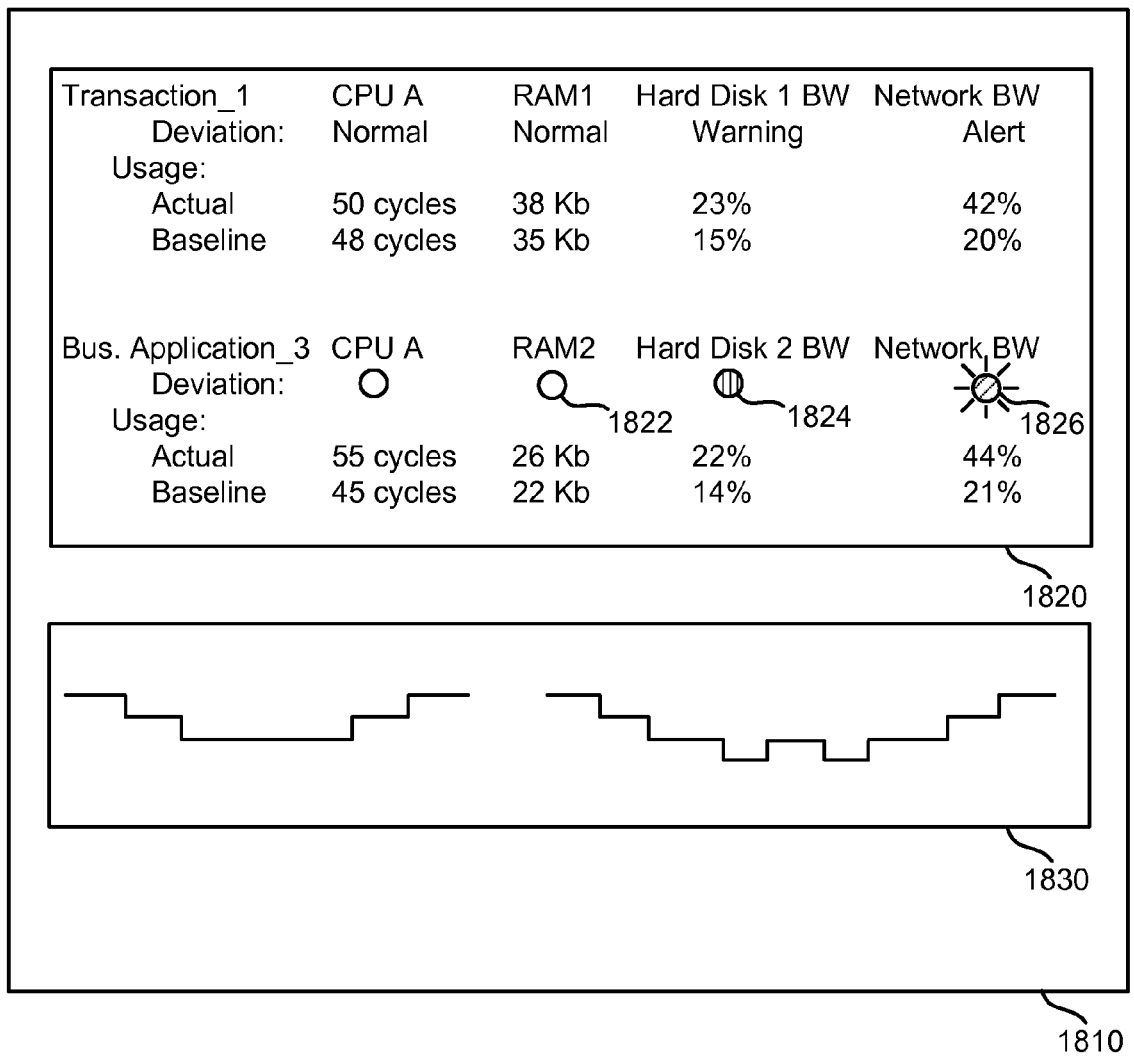
FIG. 18 is an example of a user interface for providing deviation information to a user.

FIG. 17 is a flow chart of an embodiment of a method for providing baseline deviation information to a user. Baseline deviation information may be provided to a user through an interface provided by work stations 224 or 226 of FIG. 2B. In one embodiment, the method of FIG. 17 provides more detail for step 380 of the method of FIG. 3. First, a deviation interface is provided at step 1710. The deviation interface may provide deviation information to a user for one or more selected transactions or business applications. An example of a deviation interface is illustrated in FIG. 18.

Input selecting a transaction or business application to display in the interface is received at step 1720. The input may select a transaction from a list of transactions, or allow a user to define a business application as a set of transactions, or otherwise determine a transaction or business application. Information to display for the selected transaction or business application is accessed at step 1730. The accessed information may include deviation information, actual usage value and baseline usage values for the selected transaction (or business application). The information may be accessed from Enterprise Manager 220, database 222 or some other source.

The identification of the transaction or business application and the resources used is provided in the deviation interface at step 1740. The identifications may include the name, a nickname, or some other identifier for the transaction and resources. In the interface of FIG. 18, a transaction identifier "Transaction_1" is displayed with resources used by the transaction and having identifiers of "CPU A," "RAM1," "Hard Disk 1 BW" and "Network BW." A business Application "Bus. Application_3" is also illustrated, along with corresponding resources "CPU B." "RAM2," "Hard Disk 2 BW" and "Network BW."

The deviation information, actual usage and baseline usage is displayed in the interface for each identified resource-transaction or resource-business application pair at step 1750. In some embodiments, only the deviation information is initially displayed, and the corresponding actual usage and baseline usage is provided upon a request received from a user. In the interface of FIG. 18, deviation information for Transaction_1 is displayed as "Normal" for CPU A, "Normal" for RAM1, "Warning" for Hard Disk 1 BW and "Alert" for Network BW. A "Normal" level indicates that the deviation is within an acceptable range, the "warning" level indicates that the deviation is not within an acceptable range but may not be cause for concern, the "alert" level indicates that the deviation is not within an acceptable range and that the corresponding resource is performing very poorly or not at all. Deviation information for Bus. Application_3 is expressed as icons 1822, 1824 and 1826. In particular, icon 1822 for deviation of CPU A and RAM2 usage indicates a normal level deviation, icon 1824 for deviation of Hard Disk 2 BW usage indicates a warning level deviation, and icon 1826 for deviation of network BW usage indicates an alert level of deviation. The actual usage for Transaction_1 is 50 cycles of CPU A usage, 38 kilobytes of RAM1 usage, 23% of Hard Disk 1 BW usage and 42% of Network BW usage. The baseline usage for Transaction_1 is 48 cycles of CPU A, 35 kilobytes of RAM1 usage, 15% of Hard Disk 1 BW usage and 20% of Network BW usage. The actual usage for Bus. Application_3 is 55 cycles of CPU A usage, 26 kilobytes of RAM2 usage, 22% of Hard Disk 2 BW usage and 44% of Network BW usage. The baseline usage for Bus. Application_3 is 45 cycles of CPU A usage, 22 kilobytes of RAM2 usage, 14% of Hard Disk 2 BW usage and 21% of Network BW usage.

It should be noted that the deviation levels, icons, format, actual usage values and baseline usage values illustrated in FIG. 18 are all examples of possibilities that may be implemented in a deviation interface. In some embodiments, the format, icons and other display data may be configured by a user or automatically. The present technology is not intended to be limited by the particular example icons, data, format and other characteristics in the interface of FIG. 18.

A determination is made as to whether deviation information should be displayed for a new transaction or business application at step 1760. The determination may be triggered by receiving a request from a user to display information from a new transaction or detecting some other event. If a new transaction or business application should be displayed, the method returns to step 1720 where input selecting the transaction or business application to display is received. If a new transaction or business application is not to be displayed, a determination is made as to whether new usage and deviation information is available at step 1770. New usage and/or deviation information may be available as an application is monitored and new performance data becomes available. The new information may be pushed to a workstation displaying the interface or pulled by the workstation from enterprise manager 220 or database 222. If new usage or deviation information is available, the method of FIG. 17 continues to step 1780. If no new information is available, the method returns to step 1760.

A determination is made as to whether new usage or deviation information differs from the currently displayed information at step 1780. If either the new usage or deviation information differs from the currently displayed information, the interface is updated with the new deviation, usage, and/or baseline information for changed resource-transaction and/or resource-business application pairs at step 1790. Updating the interface may include accessing the updated information and populating the interface with the updated information. The method of FIG. 17 then returns to steps 1760.

FIG. 18 is an example of a user interface 1810 for providing deviation information to a user. User interface 1810 includes deviation information window 1820 and graphical data window 1830. Deviation information window 1820 includes information such as identifiers of transactions and business applications and deviation information, actual usage data, and baseline data for resource-transaction pairs and resource-business application pairs. The deviation information may be text, graphical, or some other format as illustrated and discussed above.

Graphical data window 1830 may provide information for a particular transaction or business application in graphical form. The data may indicate relationships between components that perform a transaction, as well as the relationships of the transactions themselves, if any. Additional windows and other information may also be provided in user interface 1810 to provide more information for the resources used, usage and baseline data, the components, transactions and business applications, or other data.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A computer implemented method for monitoring a transaction, comprising:
    monitoring a plurality of transactions being performed by an application that uses a resource;
    determining a first usage of the resource by a first transaction of the plurality of transactions based on the monitoring;
    determining a difference between the first usage and a predicted usage for the resource with respect to the first transaction; and
    reporting health information for the resource with respect to the first transaction, the health information derived from the difference between the first usage and the predicted usage.

2. The computer implemented method of claim 1, wherein said determining a first usage comprises:
    querying a java virtual machine which performs the first transaction.

3. The computer implemented method of claim 1, wherein said determining a first usage comprises:
    querying an operating system that communicates with the resource.

4. The computer implemented method of claim 1, wherein said determining a first usage comprises:
    determining a transaction specific use and a non-transaction specific use of the resource.

5. The computer implemented method of claim 1, wherein said determining a first usage comprises:
    determining a resource usage associated with a thread.

6. The computer implemented method of claim 1, wherein said determining the difference comprises:
    identifying a time window; and
    calculating the predicted usage based on a set of performance data associated with the resource, the first transaction and the time window.

7. The computer implemented method of claim 6, wherein said calculating comprises:
    fitting a function to the set of performance data; and
    calculating a predicted value using the fitted function.

8. The computer implemented method of claim 1, wherein the resource comprises a central processing unit, network bandwidth, hard disk bandwidth, and memory.

9. The computer implemented method of claim 1, further comprising:
    monitoring the application while the application is performing the plurality of transactions; and
    generating performance data in response to monitoring the application, the first usage determined from the performance data.

10. The computer implemented method of claim 1, wherein said reporting comprises:
    reporting an alert if usage of the resource is determined to be abnormal.

11. A processor readable storage device having processor readable code embodied thereon, said processor readable code for programming a processor to:
  access performance data generated from monitoring an application and associated with a resource used to process a request to perform a transaction by the application;
  determine a level of use for the resource used to process the request based on the performance data, comprising determining a transaction specific resource usage and a non-transaction specific resource usage;
  determine baseline deviation information for the resource use level with respect to a predicted resource usage while processing the request, the resource use level determined from the performance data; and
  report the baseline deviation information derived from the difference between the actual resource usage and the predicted resource usage.

12. The processor readable storage device of claim 11, wherein said processor readable code for programming said processor to determine a level of use comprises processor readable code for programming said processor to:
  determine a level of use for the resource while processing a business application, the business application defined as a set of transactions.

13. The processor readable storage device of claim 11, wherein said processor readable code for programming said processor to determine a level of use comprises processor readable code for programming said processor to:
  determine a resource level of use associated with a thread.

14. The processor readable storage device of claim 11, wherein said processor readable code for programming said processor to determine baseline deviation information comprises processor readable code for programming said processor to:
  identify a time window; and
  compute a predicted value for a first data point using data within the time window using a selected function.

15. The processor readable storage device of claim 14, wherein the time window is a dynamic time window.

16. The processor readable storage device of claim 11, wherein the baseline deviation information indicates one of two or more levels of health for two or more resources used to process the request.

17. A computer implemented method for monitoring an application, comprising:
  monitoring transactions that are performed by an application on an application server;
  determining actual usage of a resource of the application server while performing a first transaction, the transactions comprising the first transaction, the determining is based on the monitoring;
  receiving input identifying a transaction for which to provide baseline analysis, the identified transaction is the first transaction;
  accessing a predicted usage the resource while processing the first transaction;
  determining a difference between the actual usage and the predicted usage for the first transaction; and
  reporting deviation information for the resource if the difference is greater than a threshold.

18. The computer implemented method of claim 17, further comprising:
  accessing two or more baseline functions;
  applying each of the two or more baseline functions to previous resource data usage values to generate predicated resource data for the resource; and
  deriving the predicted usage of the resource from the predicted resource data for the resource.

19. The computer implemented method of claim 17, further comprising:
  accessing performance data generated from monitoring the application, usage of the resource derived from the performance data.

20. The computer implemented method of claim 19, wherein said accessing performance data comprises:
  inserting monitoring code into the application by bytecode instrumentation; and
  generating the performance data using the monitoring code.

21. The computer implemented method of claim 20, wherein said generating the performance data comprises:
  detecting that a class object is created by resource class instantiation;
  reporting object data about the class object; and
  detecting that the class object is closed.

22. An apparatus for processing data, comprising:
  a communication interface;
  a storage device;
  a hard disk; and
  a processor in communication with said storage device, said hard disk and said communication interface, said processor monitors transactions, determines a resource usage level based on the monitoring, and reports deviation information, the usage level determined for the storage device, the hard disk and the processor for each of the transactions, the deviation information indicating whether the resource usage level differs from an expected resource usage level by more than a threshold.

23. The apparatus of claim 22 further comprising:
  a dispatch unit that dispatches instructions from a thread to an execution pipeline, a usage level determined for the thread.

24. The apparatus of claim 22, further comprising:
  a network communication device in communication with said processor, said processor determines a usage level and deviation information for said network communication device for each of the transactions.

* * * * *